US011575840B2

(12) United States Patent
Kim et al.

(10) Patent No.: US 11,575,840 B2

(45) Date of Patent: Feb. 7, 2023

(54) METHOD FOR CONTROLLING MOBILE DEVICE CRADLE AND COMPOSING IMAGES

(71) Applicant: 3I INC., Daegu (KR)

(72) Inventors: Ken Kim, Seoul (KR); Ji Wuck Jung, Goyang-si (KR)

(73) Assignee: 3i Inc., Daegu (KR)

( * ) Notice: Subject to any disclaimer, the term of this patent is extended or adjusted under 35 U.S.C. 154(b) by 0 days.

(21) Appl. No.: 17/412,769

(22) Filed: Aug. 26, 2021

(65) Prior Publication Data

US 2021/0392265 A1 Dec. 16, 2021

Related U.S. Application Data

(63) Continuation of application No. PCT/KR2020/016188, filed on Nov. 17, 2020.

(30) Foreign Application Priority Data

Nov. 19, 2019 (KR) ........................ 10-2019-0148221
Nov. 19, 2019 (KR) ........................ 10-2019-0148225
(Continued)

(51) Int. Cl.
*H04N 5/232* (2006.01)

(52) U.S. Cl.
CPC ..... *H04N 5/23299* (2018.08); *H04N 5/23219* (2013.01); *H04N 5/23232* (2013.01); *H04N 5/232933* (2018.08)

(58) Field of Classification Search
CPC ....... H04N 5/232933; H04N 5/232945; H04N 5/23219; H04N 5/23299; H04N 5/23232
(Continued)

(56) References Cited

U.S. PATENT DOCUMENTS 9,977,312 B1 * 5/2018 Lefever .................. F16M 11/08
10,279,481 B2 * 5/2019 Lee ...................... G06V 10/245
(Continued)

FOREIGN PATENT DOCUMENTS

JP 2013162345 8/2013
JP 2017-181766 A 10/2017
(Continued)

OTHER PUBLICATIONS

International Search Report and Written Opinion dated Mar. 30, 2021 in international Application No. PCT/KR2020/016188, in 12 pages. (*English translation of ISR in 4 pages.*).
(Continued)

*Primary Examiner* — Pritham D Prabhakher
(74) *Attorney, Agent, or Firm* — JCIPRNET

(57) ABSTRACT

The described technology is a technique related to a method for controlling a mobile device cradle and combining images. The method for controlling a mobile device cradle performed in an application of a user device linked with the mobile device cradle, comprises: pairing the mobile device cradle with the user device; starting capturing an image based on an input of a user; extracting a subject from a captured image; calculating a moving speed and a moving direction of the subject extracted; and calculating a rotation speed and a rotation direction of a motor included in the mobile device cradle based on the calculated moving speed and moving direction, and controlling the motor based on the calculated rotation speed and rotation direction.

17 Claims, 23 Drawing Sheets

(30) Foreign Application Priority Data

Jan. 6, 2020 (KR) ........................ 10-2020-0001419
Jan. 6, 2020 (KR) ........................ 10-2020-0001427

(58) Field of Classification Search
USPC ...................................................... 348/222.1
See application file for complete search history.

(56) References Cited

U.S. PATENT DOCUMENTS

| | | | | |
|---|---|---|---|---|
| 10,356,301 | B2 * | 7/2019 | Oshima | H04N 5/23293 |
| 10,620,507 | B2 * | 4/2020 | Lefever | H04N 5/2251 |
| 10,750,086 | B2 * | 8/2020 | Jang | H04N 13/366 |
| 2004/0223062 | A1 * | 11/2004 | Pettegrew | F16M 11/18 348/208.99 |
| 2016/0127653 | A1 * | 5/2016 | Lee | H04N 5/232935 348/239 |
| 2017/0165843 | A1 * | 6/2017 | Lee | H04N 7/185 |
| 2018/0109729 | A1 * | 4/2018 | Jang | H04N 5/232935 |
| 2018/0139374 | A1 * | 5/2018 | Yu | H04N 21/21805 |
| 2018/0267391 | A1 * | 9/2018 | Lefever | F16M 13/02 |
| 2018/0295270 | A1 * | 10/2018 | Oshima | H04N 5/232061 |
| 2018/0368656 | A1 * | 12/2018 | Austin | A61B 1/051 |

FOREIGN PATENT DOCUMENTS

| | | | |
|---|---|---|---|
| KR | 10-0869952 | B1 | 11/2008 |
| KR | 10-2015-0087681 | A | 7/2015 |
| KR | 10-2016-0051390 | A | 5/2016 |
| KR | 10-1626828 | B1 | 6/2016 |
| KR | 10-2017-0071210 | A | 6/2017 |
| KR | 10-2017-0086392 | A | 7/2017 |

OTHER PUBLICATIONS

Office Action dated Oct. 13, 2020 in Korean Application No. 10-2020-0001427, in 5 pages.
Office Action dated Nov. 13, 2020 in Korean Application No. 10-2020-0001419, in 5 pages.
Final Office Action dated May 30, 2021 in Korean Application No. 10-2020-0001427, in 2 pages.
Notice of Rejection Decision dated Jul. 23, 2021 in Korean Application No. 10-2020-0001419, in 4 pages.
Fun Pick YouTube Image, Automatic face recognition Bluetooth selfie stick, panorama photographic capturing method and device, May 24, 2019.
Korean Financial News YouTube Image, Space capture media solution, 3I start-up hero, May 24, 2019.

* cited by examiner

<a1> <a2>

<c1> <c2> <c3>

<d1> <d2>

<h1> <h2>

<i1> <i2>

⟨j1⟩

⟨j2⟩

METHOD FOR CONTROLLING MOBILE DEVICE CRADLE AND COMPOSING IMAGES

CROSS-REFERENCE TO RELATED APPLICATION

This is a continuation application of International Patent Application No. PCT/KR2020/016188, filed on Nov. 17, 2020, which claims priority to Korean Patent Application No. 10-2019-0148221 filed on Nov. 19, 2019, Korean Patent Application No. 10-2019-0148225 filed on Nov. 19, 2019, Korean Patent Application No. 10-2020-0001419 filed on Jan. 6, 2020 and Korean Patent Application No. 10-2020-0001427 filed on Jan. 6, 2020 in the Korean Intellectual Property Office, and all the benefits accruing therefrom under 35 U.S.C. 119, the contents of each of which in their entirety are herein incorporated by reference.

BACKGROUND

Field

The described technology relates to a method for controlling a mobile device cradle and combining images. Specifically, the described technology relates to a method of controlling the rotation speed and rotation direction of a mobile device cradle by tracking the movement of a subject extracted from a captured image. In addition, the described technology relates to an image combination method for visualizing and displaying a clear zone on a photographing screen and combining captured images based on the visualized clear zone.

Description of the Related Technology

In general, mobile phones produced for the purpose of long-distance communication have been able to take photos or images with the addition of a camera function besides the traditional communication function owing to technological advances. In particular, as the spread of smartphones has enabled remote communication of photos or images, it is becoming more common to create and share image information with a mobile phone instead of a conventional portable camera.

However, a mobile phone with a camera function added thereto has a drawback that photos cannot be taken clearly due to shaking when shooting photos compared to a conventional camera, and involves inconvenience when shooting a video while holding the mobile phone for a prolonged time.

In order to resolve such inconvenience, users take photos lately using a selfie stick and a tripod. However, there was an inconvenience of having to move along with the movement of the subject in the case of shooting videos, and in this case, there was a problem of being difficult to obtain clear images because it was still difficult to shoot images stably.

In a conventional mobile terminal device or the like, a user arbitrarily adjusts the divided shooting areas manually to shoot. That is, while having a digital camera or a terminal device having such a function fixed at a tripod or the like, the viewing angle of the lens is constantly moved in one direction to the left or right to shoot. At this time, since a user horizontally moves the lens angle arbitrarily without a certain reference, there is a problem that the divided captured photos may be taken sporadically without being connected to each other.

In addition, when combining a plurality of divided captured photos, since the shooting angle is not constant, the sizes of the overlapping areas between the captured photos are not constant in most cases. Therefore, when connecting a plurality of photos, if the overlapping area between adjacent divided photos is too wide, there is a problem that the connecting portion of the divided photos becomes unnatural or the combination thereof may not be made.

SUMMARY

It is an object of the described technology to provide a method for controlling a mobile device cradle that operates automatically so that a moving subject is continuously included in a screen by rotating a user device mounted on the mobile device cradle together as the subject moves.

It is an object of the described technology to provide a method for controlling a mobile device cradle in which the rotation speed of the mobile device cradle is automatically adjusted so that a subject is included in the screen if an extracted subject moves out of a photographing screen.

It is an object of the described technology to provide a method for controlling a mobile device cradle that automatically adjusts the shooting direction so that a subject continues to be included in the screen by extracting another feature point of the subject when a feature point of the subject extracted disappears from within the photographing screen.

It is an object of the described technology to provide an image combination method capable of combining a plurality of images into a single image by combining captured images using a clear zone.

It is an object of the described technology to provide an image combination method capable of creating a new moving image by capturing images and moving images in each area and then combining the captured images and moving images using a clear zone.

It is an object of the described technology to provide an image combination method capable of combining the best-looking images for each area using a clear zone after continuously shooting images in each area.

The objects of the described technology are not limited to those mentioned above, and other objects and advantages of the present invention that have not been mentioned can be understood by the following description, and will be more clearly understood by embodiments of the described technology. In addition, it will be readily appreciated that the objects and advantages of the described technology can be realized by the means and combinations thereof set forth in the claims.

One aspect is a method for controlling a mobile device cradle performed in an application of a user device linked with the mobile device cradle, the method comprising: pairing the mobile device cradle with the user device. starting capturing an image based on an input of a user. extracting a subject from a captured image, calculating a moving speed and a moving direction of the subject extracted, and calculating a rotation speed and a rotation direction of a motor included in the mobile device cradle based on the calculated moving speed and moving direction, and controlling the motor based on the calculated rotation speed and rotation direction.

In the above method, wherein the controlling the motor comprises: setting a region to position the subject based on the input of the user, and changing the rotation speed and the rotation direction so that a location of the subject is maintained in the region.

In the above method, wherein the controlling the motor comprises: if the subject has moved out of a photographing screen, setting the rotation speed to a predetermined maximum rotation speed, and setting the rotation direction to be the same as the direction in which the subject has moved out.

In the above method, wherein the controlling the motor comprises: resetting the rotation speed to be within a predetermined range when the subject that has moved out from within the moving photographing screen is found.

In the above method, further comprising: providing a user interface capable of turning on or off an operation of setting the rotation speed to the predetermined maximum rotation speed if the subject has moved out of the photographing screen.

In the above method, wherein the calculating a moving speed and a moving direction of the subject comprises: calculating a moving speed and a moving direction of a feature point of the subject, and if the feature point of the subject disappears from a photographing screen, re-extracting another feature point different from the feature point included in the subject, and calculating a moving speed and a moving direction of the re-extracted feature point.

In the above method, wherein the calculating a moving speed and a moving direction of the subject comprising: recognizing a face of the user included in the subject and setting the recognized face of the user first as the feature point, and re-extracting another body part or object adjacent to the face and setting the re-extracted another body part or object as the another feature point when the recognized face disappears from the photographing screen.

In the above method, the calculating a moving speed and a moving direction of the subject comprises: resetting the face as a feature point if the face that had disappeared appears again on the photographing screen.

In the above method, wherein the setting a subject to be extracted comprises: that the application automatically recognizes and sets the subject included in the image, or the application manually sets a part selected by the user as the subject.

Another aspect is a method for image combination performed in an application of a user device linked with a mobile device cradle, the method comprising: pairing the mobile device cradle with the user device; starting capturing an image based on an input of a user, displaying a clear zone on a photographing screen, capturing an image for a first area displayed on the photographing screen, capturing an image for a second area different from the first area, by operating a motor included in the mobile device cradle, and combining a plurality of captured images using the clear zone.

In the above method, wherein the images captured for the first and second areas each include an area of the clear zone, and wherein the combining the images comprises: extracting a common part between the clear zones for the plurality of images captured, and combining the plurality of images by using the common part extracted.

In the above method, wherein the image for the first area comprises a still image of the first area, and the image for the second area comprises a moving image of the second area.

In the above method, wherein the combining the images comprises: creating a new moving image by merging the first area and the second area in which the still image is arranged on one side and the moving image is arranged on the other side around the common part.

In the above method, further comprising: providing a user interface for receiving an input for a rotation direction of the motor and a shooting time of the moving image.

In the above method, further comprising: providing a user interface for receiving an input for the number of images to be combined and a rotation direction of the motor, and repetitively performing an operation of capturing an image for another area to which a movement is made based on a particular rotation angle and the rotation direction from an area already captured, according to the number of images to be combined.

In the above method, wherein the rotation angle is determined based on the number of images to be combined and the size of the clear zone.

In the above method, wherein the capturing an image for a first area and the capturing an image for a second area comprise continuously capturing for corresponding areas, and then manually or automatically selecting one image for each corresponding area out of continuously captured images, and the combining a plurality of images comprises combining images selected in each area into one image.

In the above method, wherein the clear zone may be displayed on one side or opposite sides of the photographing screen, and a location and a size thereof are changed according to the input of the user.

In the above method, wherein the clear zone comprises: changing its location on the photographing screen according to a rotation direction of the mobile device cradle based on the input of the user, and being displayed on one side of the photographing screen if the first area is captured, and being displayed on both sides of the photographing screen if the second area is captured. device The method for controlling a mobile device cradle in accordance with the described technology can reduce the inconvenience of having to move the position of a camera every time according to a change in the position of a user by rotating a user device mounted on the mobile device cradle together as the subject moves.

In addition, the described technology can capture the fast movement of a subject and continue shooting an image by automatically adjusting the rotation speed of a mobile device cradle so that the subject is included in the screen if an extracted subject moves out of a photographing screen, thereby improving the convenience for users.

Further, the described technology can improve the accuracy of a subject tracking function by allowing the subject to be continuously included in the screen by extracting another feature point of the subject when a feature point of the subject extracted disappears from within the photographing screen.

On the other hand, the image combination method in accordance with the described technology can provide pleasure to users by combining images and moving images to create a new moving image.

Moreover, in the described technology, the mobile device cradle can rotate automatically to capture images and automatically combined using a clear zone. Through this, the user does not have to move the device directly to each shooting area or derive combination locations within common parts between images, thereby improving convenience.

Furthermore, the described technology can reduce the hassle of the user having to shoot again when an image of the quality desired by the user is not captured by acquiring a large number of images for each area through continuous shooting and selecting the most suitable image.

The effects of the described technology are not limited to those described above, and those of ordinary skill in the art of the described technology can readily derive various effects of the described technology from the configurations of the described technology.

DETAILED DESCRIPTION

Figure 1:
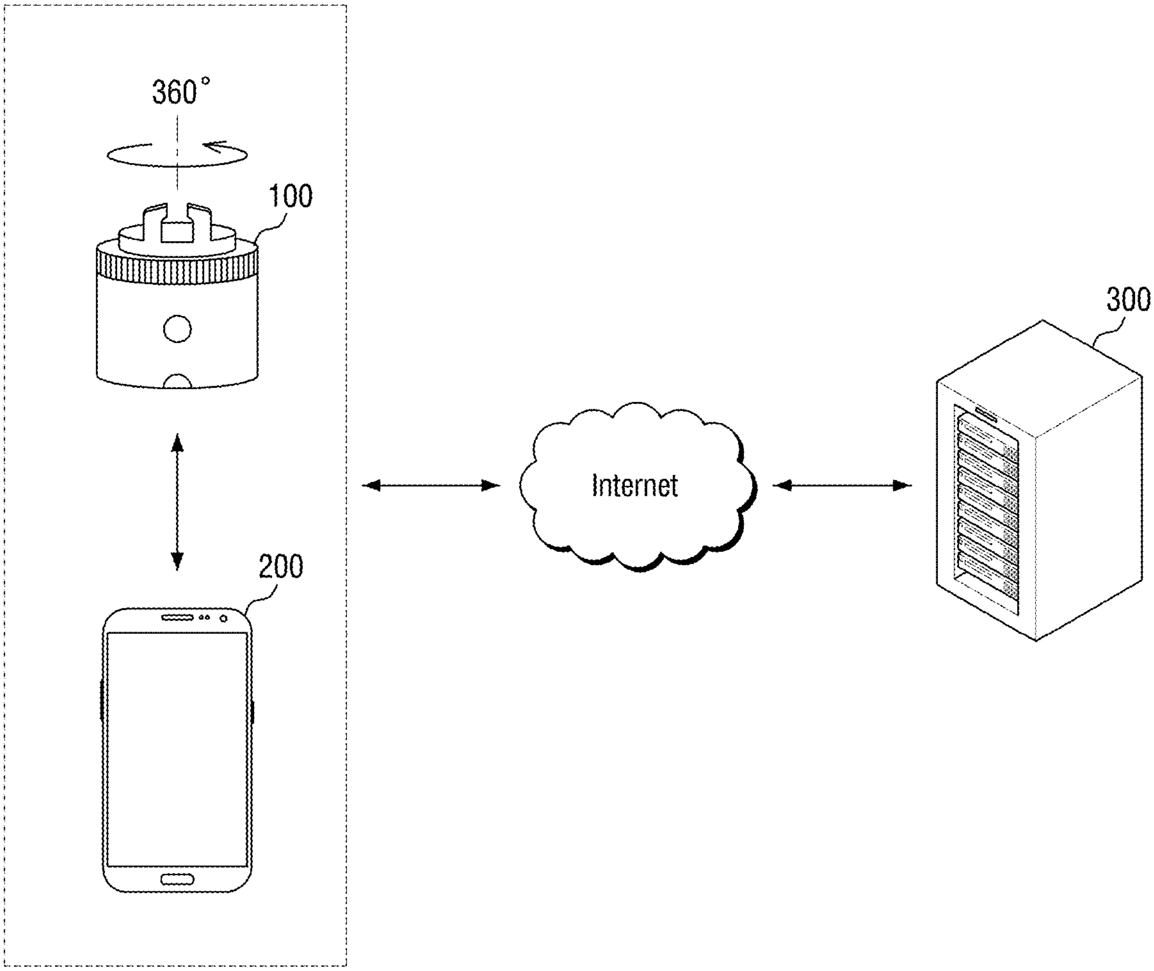
FIG. 1 is a schematic diagram showing a system for controlling a mobile device cradle and combining images in accordance with some embodiments of the described technology.

The advantages and features of the described technology and methods of achieving them will be apparent when reference is made to the embodiments described in detail below in conjunction with the accompanying drawings. However, the described technology is not limited to the embodiments disclosed below but will be implemented in a variety of different forms, the present embodiments merely make the disclosure of the described technology complete and are provided to fully convey the scope of the invention to those of ordinary skill in the art to which the described technology pertains, and the described technology is defined only by the scope of the claims. Like reference numerals refer to like components throughout the specification.

The terms used herein are for describing embodiments and are not intended to limit the described technology. Herein, singular forms also include plural forms unless specifically stated in the context. As used herein, "comprises" and/or "comprising" means that the components, steps, operations, and/or elements mentioned do not preclude the presence or addition of one or more other components, steps, operations and/or elements.

Unless otherwise defined, all terms (including technical and scientific terms) used herein will be used in the sense that can be commonly understood by those of ordinary skill in the art to which the described technology pertains. Further, terms defined in commonly used dictionaries are not to be interpreted ideally or excessively unless explicitly defined.

First, a system for controlling a mobile device cradle and combining images in accordance with an embodiment of the described technology will be described in detail below with reference to the drawings.

FIG. 1 is a schematic diagram showing a system for controlling a mobile device cradle and combining images in accordance with some embodiments of the described technology.

Referring to FIG. 1, the system for controlling a mobile device cradle and combining images in accordance with an embodiment of the described technology includes a mobile device cradle 100, a user device 200, and a control server 300.

The mobile device cradle 100 is a photographing auxiliary device used to capture a subject by using the camera of the user device 200 after holding the user device 200 thereon. The mobile device cradle 100 can automatically adjust the shooting direction and shooting angle of the user device 200 fixed to the rotatable holding unit, and may be controlled via an application installed in the user device 200.

The user device 200 may transmit data such as the location of a subject in the photographing screen, the moving direction of the subject, the moving speed, and the captured image to the control server 300 via the installed application.

In embodiments of the described technology, the user device 200 may refer to a mobile electronic device that can have a unique identification number, such as a mobile phone, a smartphone, a wearable device (e.g., a watch-type device, etc.), etc. Here, the operating system (OS) of the user device 200 is not limited to a specific operating system (e.g., iOS or Android operating system), of course.

Further, the user device 200 may include an input unit configured to receive a user input, a display unit configured to display visual information, a communication module configured to transmit and receive signals to and from the outside, and a controller configured to process data, control the respective units inside the user device 200, and control data transmission/reception between the units. In the following, what the controller performs inside the user device 200 according to the commands of the user is collectively referred to as being performed by the user device 200. In this case, the calculations necessary to control the rotation speed, rotation direction, etc., of the mobile device cradle 100 may be performed by the user device 200.

Additionally, in another embodiment of the described technology, the control server 300 may control the rotation speed, the rotation direction, etc., of the mobile device cradle 100 by using data received as input via the application installed in the user device 200.

The control server 300 and the user device 200 may be implemented as a server-client system. Further, the control server 300 may be the calculation performer that performs calculations necessary to control the mobile device cradle 100.

In this case, the user device 200 may transmit data such as the location of a subject in the photographing screen, and the moving direction and moving speed of the subject to the control server 300 via the installed application.

The user device 200 may send and receive at least one wireless signal from the control server 300 over a mobile communication network constructed based on technical standards or communication methods for mobile communication via a communication module.

The control server 300 may manage and store the data received from the user device 200. The data stored in the control server 300 may be shared with the mobile device cradle 100 and the user device 200. Here, the control server 300 is a computer system that provides information or services to clients through a communication network, and may refer to a computer (sever program) or a device.

In addition, the control server 300 may be directly operated or managed by a particular company or individual, or may be outsourced, and may be operated by the same entity. Also, as a matter of course, the functions performed by the control server 300 may be performed separately by a plurality of servers. However, a description will be provided in the following by taking as an example that the user device 200 is the calculation performer of the control operation of the mobile device cradle 100 for the convenience of description.

On the other hand, in another embodiment of the described technology, the control server 300 may control the rotation speed, the rotation direction, etc., of the mobile device cradle 100 by using data received as input via the application installed in the user device 200. In addition, the captured images can be combined using a clear zone.

Likewise, the control server 300 and the mobile device cradle 100 may be implemented as a server-client system. The control server 300 may receive a rotation angle and a rotation direction as input through a user interface (For example, an interface for a 50:50 function, an interface for a Many Me function, etc.) (hereinafter, a user interface) provided by an application installed in advance in the user device 200. In this case, the rotation angle may be determined based on the number of images to be combined and the size of the clear zone. The control server 300 may display the clear zone on the photographing screen of the user device 200.

After shooting for a first area is completed, the control server 300 may rotate a rotating module (110 in FIG. 2) of the mobile device cradle 100 to a preset angle including a preset rotation angle and a rotation direction via a control signal, and then proceed to capture the next area.

In this case, the captured images may be transmitted to the control server 300.

The control server 300 may extract common portions of the clear zone between the plurality of captured images. Then, the plurality of images may be combined so that the common portions overlap.

At this time, the control server 300 may transmit and receive data to and from the mobile device cradle 100 and the user device 200 via the Internet, for example, a wired or wireless network.

Although only one mobile device cradle 100 is illustrated in the drawing, the described technology is not limited thereto, and the control server 300 may operate in conjunction with a plurality of mobile device cradles 100.

In the image combination method of the described technology, what controls the mobile device cradle 100 may be the user device 200 or the control server 300. However, a description will be provided in the following by taking as an example that the user device 200 controls the mobile device cradle 100 for the convenience of description.

Figure 2:
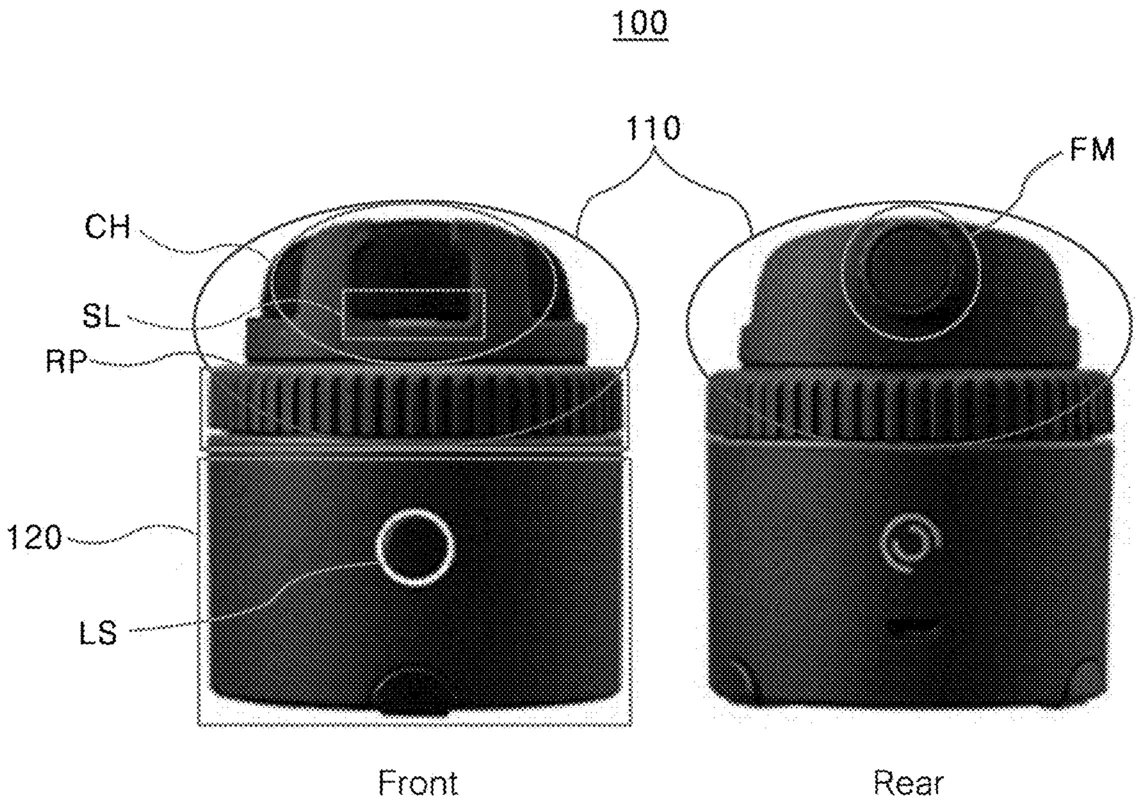
FIG. 2 is a diagram showing a mobile device cradle in accordance with some embodiments of the described technology.
Figure 3:
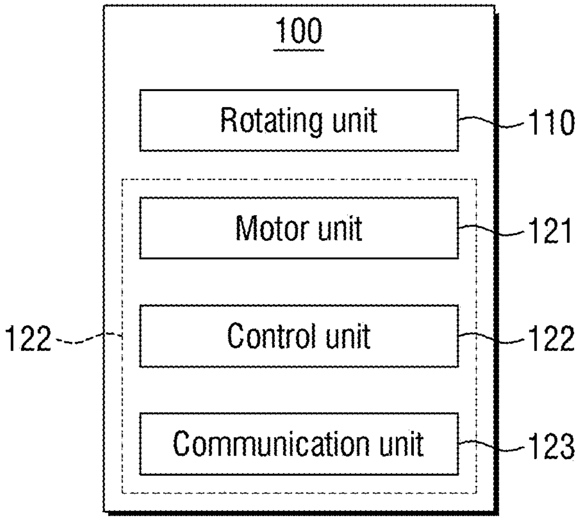
FIG. 3 is a block diagram for illustrating the configuration of a mobile device cradle in accordance with some embodiments of the described technology.

FIG. 2 is a diagram showing a mobile device cradle in accordance with some embodiments of the described technology. FIG. 3 is a block diagram for illustrating the configuration of a mobile device cradle in accordance with some embodiments of the described technology.

Referring to FIGS. 1, 2 and 3, the mobile device cradle 100 in accordance with an embodiment of the described technology may include a rotating module 110 and a main body unit 120.

The rotating module 110 may include a fixing table CH, a horizontal table SL, a fastener FM, and a 360-degree rotating table RP. The fixing table CH, the horizontal table SL, and the fastener FM may be arranged on the 360-degree rotation table RP.

As an example, the fixing table CH may fix the user device 200. The user can fix the user device 200 horizontally by placing the user device 200 on the horizontal table SL and then fixing it with the fixing table CH.

The user can fix the user device 200 so as not to shake by positioning the user device 200 between the fixing table CH and the fastener FM and then tightening the fastener FM.

The 360-degree rotation table RP allows a moving subject to be captured by rotating the user device 200. The 360-degree rotation table RP may be externally connected to a motor 121. Accordingly, the rotation direction and rotation speed of the 360-degree rotation table RP may be changed according to the movement of the motor 121 in the main body unit 120. If the 360-degree rotation table RP rotates, the fixing table CH, the horizontal table SL, and the fastener FM coupled onto the 360-degree rotation table RP can be rotated along therewith.

At this time, if the user device 200 is fixed to the fixing table CH, the user device 200 may rotate along according to the rotation of the 360-degree rotation table RP.

The exterior of the main body unit 120 may include a power button LS, a support, and the like. The user may turn the power of the mobile device cradle 100 on or off by touching or clicking the power button LS.

At this time, the user can check the operating state of the mobile device cradle 100 based on whether the lamp of the power button LS of the mobile device cradle 100 is illuminated or not.

For example, if the mobile device cradle 100 is in operation, the mobile device cradle 100 may cause the lamp (e.g., an LED) included in the power button LS to emit light. However, if the power of the mobile device cradle 100 is turned off, the mobile device cradle 100 may stop the power button LS from emitting light.

Additionally, the mobile device cradle 100 may further include a support formed on the lower side of the main body unit 120. The support table can fix the mobile device cradle 100 so as to be maintained horizontally without shaking by lowering the center of gravity of the mobile device cradle 100.

Referring to FIGS. 2 and 3, the mobile device cradle 100 may include a rotating module 110 and a main body unit 120.

The main body unit 120 may include a motor 121, a controller 122, and a communication module 123. Based on a control signal received from the controller 122, the motor 121 may set the rotation direction and rotation speed of the motor in the mobile device cradle 100. In the following, what the motor performs inside the motor 121 is collectively referred to as being performed by the motor 121. When the motor 121 rotates in the set rotation direction and rotation speed, the 360-degree rotation table RP connected to the motor 121 may rotate in the same rotation direction and rotation speed as the motor 121.

The controller 122 may calculate the moving speed, the moving direction, etc., of a subject extracted via the user device 200. The controller 122 may calculate the rotation speed and the rotation direction of the motor 121 based on the calculated values. The rotation speed and rotation direction of the motor 121 calculated may be converted into a control signal and transmitted to the motor 121.

At this time, the controller 122 may control the controller 122 so that the rotating module 110 of the mobile device cradle 100 rotates to an angle inputted in advance via the user device 200. The angle received as input in advance may be converted into a control signal and transmitted to the motor 121.

The communication module 123 may transmit and receive data to and from the user device 200 via a communication module (e.g., Wi-Fi or Bluetooth) that uses a wireless communication protocol. Further, the communication module 160 may transmit a control signal or the like received from the controller 122 to the motor 121.

Figure 4:
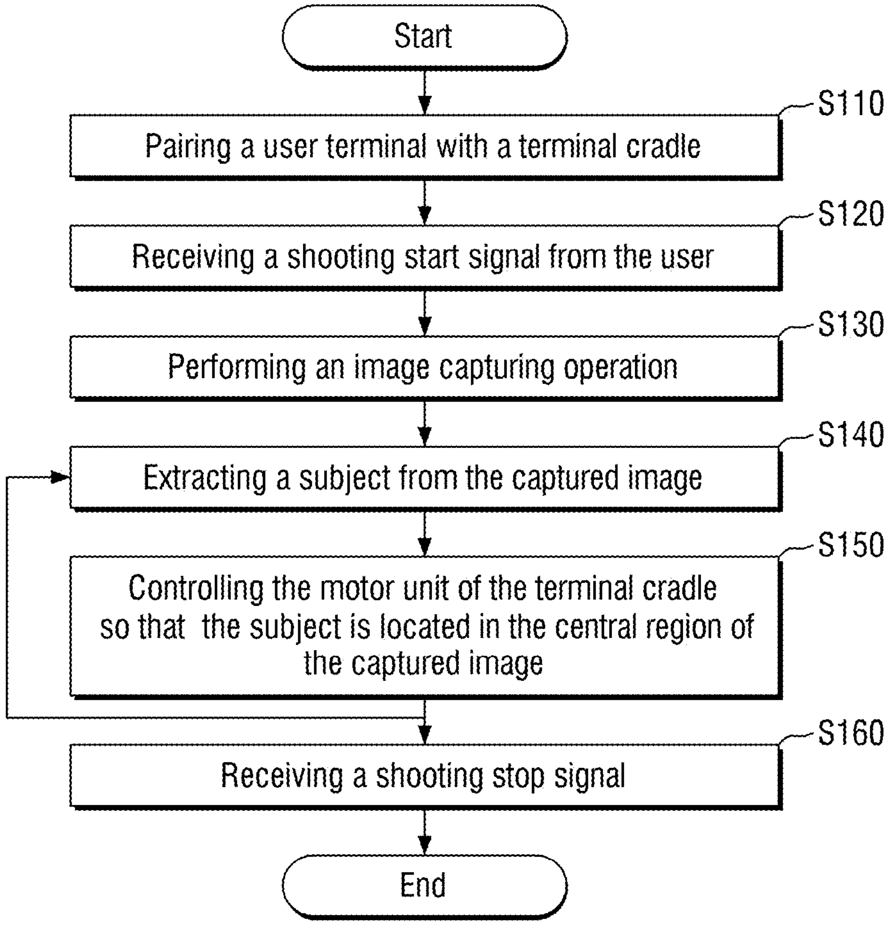
FIG. 4 is a flowchart for illustrating a method for controlling a mobile device cradle in accordance with an embodiment of the described technology.

FIG. 4 is a flowchart for illustrating a method for controlling a mobile device cradle in accordance with an embodiment of the described technology.

Referring to FIGS. 1, 3, and 4, in the method for controlling the mobile device cradle in accordance with an embodiment of the described technology, the user device 200 is paired with the mobile device cradle 100 (S110). At this time, the user device 200 and the mobile device cradle 100 may be paired based on a predetermined communication protocol.

The user device 200 receives a shooting start signal from the user (S120). In this case, the user may set automatic shooting via an application installed in the user device 200. Also, shooting can be started by using a shooting button in the photographing screen and a shooting button on the remote controller.

The user device 200 performs an image capturing operation (S130). At this time, the captured images may be transmitted to the control server 300.

The user device 200 extracts a subject from the captured image (S140). At this time, the user may directly set a subject to be extracted, and the control system of the mobile device cradle 100 may automatically set a subject to be extracted.

The user device 200 controls the motor 121 of the mobile device cradle 100 so that the subject is located in the central region of the captured image (S150). In this case, the central region may be set automatically by the user device 200 or may be set by specifying a subject location region using an application by the user.

As an example, if the extracted subject moves, the user device 200 may calculate data such as the moving direction, the moving speed, etc., of the subject. Based on the calculated data, the user device 200 may generate a control signal via the controller 122 of the mobile device cradle 100. By using the control signal received, the controller 122 can position the subject in the central region by controlling the rotation speed and the rotation direction of the motor 121 of the motor 121.

At this time, the motor 121 is coupled to the rotating module 110 of the mobile device cradle, and if the motor 121 rotates, the rotating module 110 may rotate at the same rotation speed and rotational direction as the motor 121. However, the described technology is not limited thereto, and the user may change and set the location (e.g., right, left, etc.) to position the extracted subject via the application.

The user device 200 repetitively performs steps S140 to S150 until the shooting is finished.

The user device 200 receives a shooting stop signal from the user device 200 (S160).

Figure 5:
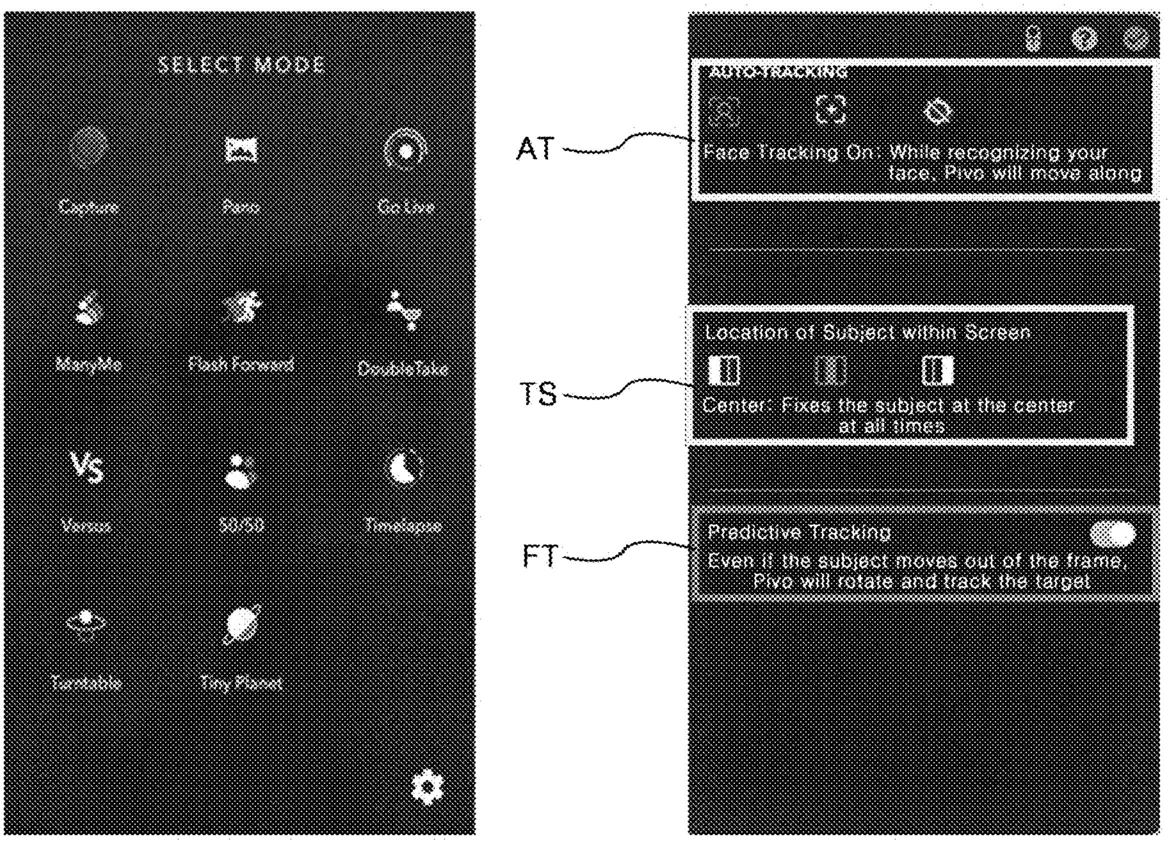
FIG. 5 is a diagram for illustrating an interface for controlling a mobile device cradle in accordance with an embodiment of the described technology.

FIG. 5 is a diagram for illustrating an interface for controlling a mobile device cradle in accordance with an embodiment of the described technology.

Referring to FIGS. 1 and 3, and <a1> of FIG. 5, the user may select a shooting function by using a shooting menu within the application.

If the user clicks or touches a shooting menu button in the application, the user device 200 may display a shooting menu pop-up on the user device 200. The shooting menu pop-up may include a capture mode, a panorama mode, a Many Me mode, a 50:50 mode, and the like. The user can click or touch the icon of the desired shooting mode to execute.

Referring to <a2>, the user may set tracking by using a tracking setting pop-up.

As an example, if the user touches the capture mode photographing screen or swipes and clicks a setting button, the user device 200 may display a tracking setting pop-up window. The tracking setting pop-up window may include a tracking type setting menu AT, a subject location setting menu TS, a predictive tracking setting menu FT, etc.

The user may select a tracking type using the tracking type setting menu AT.

For example, if the user selects face tracking, the user device 200 may extract the face of the subject as a feature point from the captured image. The user device 200 may position the face of the subject in the central region of the captured image by changing the rotation speed and rotation direction of the motor 121 whenever the face of the subject moves.

As another example, if the user selects action tracking, the user device 200 may extract a subject from the captured image. The user device 200 may position the subject in the central region of the captured image by rotating the motor 121 and the rotating module 110 of the mobile device cradle 100 whenever the subject moves.

In addition, the user may select a subject location region (e.g., left, right, and center) in the captured image by using the subject location setting menu TS.

For example, if the user selects the left, the user device 200 may rotate the motor 121 of the mobile device cradle 100 so that the subject in the captured image is located within the left region block. If the subject moves to the right in the screen, shooting may be made so that the subject in the captured image is located in the left region block by rotating the motor 121 of the mobile device cradle 100 to the right.

In this case, the size and location of the subject location region may be set automatically by the user device 200 and may be set directly by the user.

As an example, the user may select a subject location region in the subject location setting menu TS. When the user selects a subject location region, the user device 200 may display the subject location region block on the photographing screen. The user can adjust the size and location by touching or clicking the subject location region block in the photographing screen.

In addition, the user may execute a predictive tracking mode by using the predictive tracking setting menu FT. If the user executes the predictive tracking mode, the user device 200 can track and capture the subject by rotating the mobile device cradle 100 even if the subject moves out of the photographing screen.

Specifics thereof will be described in detail with reference to FIGS. 10 to 11.

In the following, a face tracking function and an action tracking function in accordance with an embodiment of the described technology will be described in detail.

Figure 6:
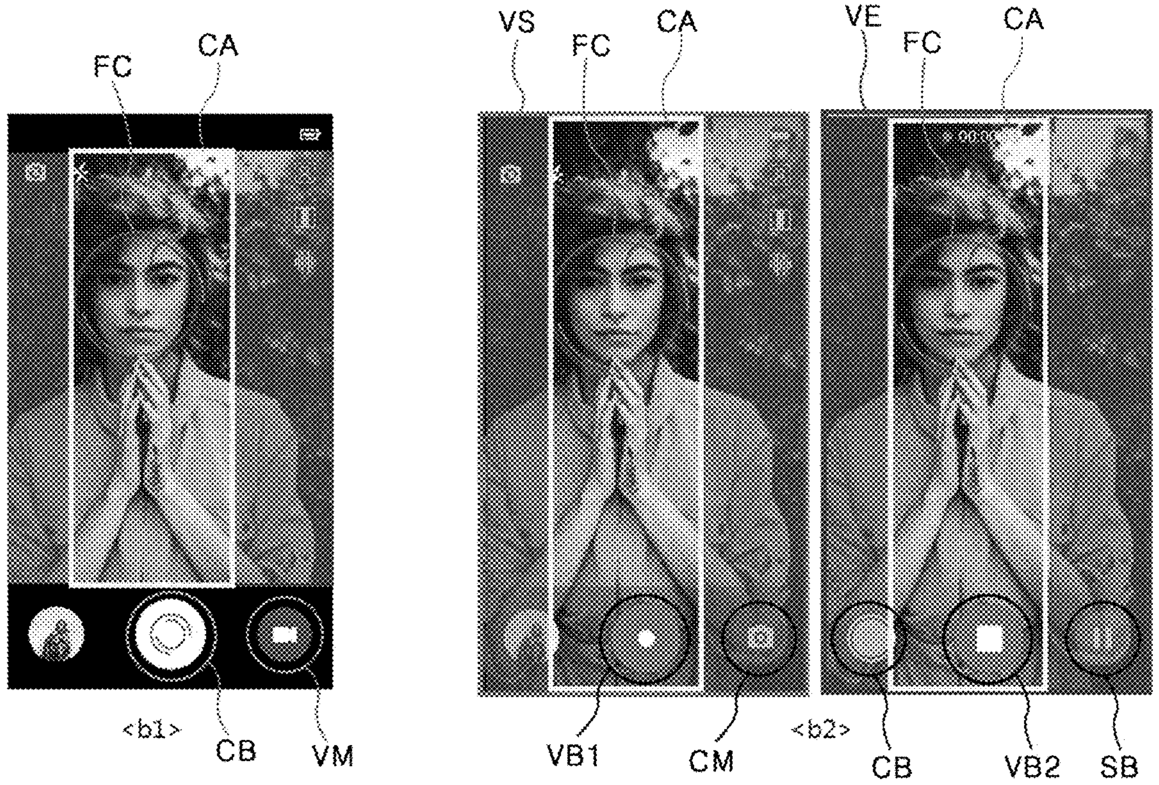
FIG. 6 is a view for illustrating a face tracking function of a mobile device cradle in accordance with an embodiment of the described technology.

FIG. 6 is a view for illustrating a face tracking function of a mobile device cradle in accordance with an embodiment of the described technology.

Referring to FIGS. 1 and 3, and <b1> of FIG. 6, the user device 200 may capture images by using a face tracking function.

As an example, if the user selects face tracking, the user device 200 may extract the face of a subject in the photographing screen and then display a face recognition mark FC on the face of the subject.

At this time, the face of the subject may be extracted automatically by the user device 200 or may be extracted by specifying directly by the user.

The user device 200 may rotate the motor 121 of the mobile device cradle 100 so that the face recognition mark FC is displayed in the central region block CA. If the user sets the subject location to the right or left, the user device 200 may rotate the motor 121 of the mobile device cradle 100 so that the face recognition mark FC is displayed in the right region block or the left region block.

Next, when the face recognition mark FC is displayed in the central region block CA, the user device 200 may capture an image.

At this time, if the user has set an automatic mode, the user device 200 can proceed with automatic shooting.

On the other hand, if the user has set a manual mode, the user can shoot directly by selecting a shooting button in a remote controller or clicking or touching a shooting button CB in the photographing screen.

If the user touches or clicks a video shoot switch button VM, the user device 200 can switch the image photographing screen to a video photographing screen.

Referring to <b2>, the user device 200 can capture a video using face tracking.

On the video shoot standby screen VS, the user device 200 may display a face recognition mark FC on the face of the subject in the photographing screen.

The user device 200 may rotate the motor 121 of the mobile device cradle 100 so that the face recognition mark FC is displayed in the central region block CA.

In this case, the user may switch the video photographing screen to the image photographing screen by touching or clicking an image shoot switch button CM.

The described technology is not limited thereto, and the user device 200 may automatically start shooting when the face recognition mark FC displayed on the face of the subject face is displayed in a region block set by the user after the face of the subject has been extracted.

Before starting to shoot a video, the user can freely switch to the image photographing screen by touching or clicking the image shoot switch button CM.

On the video shoot progress screen VE, the face of the subject is maintained in a region block (e.g., the central region block) set by the user.

At this time, the user may capture a video screen that is being shot by touching or clicking the capture button CB. Also, shooting can be temporarily stopped by clicking a pause button SB, and it can be resumed by clicking it again.

For instance, if the user has set the location of the subject to the central region block CA, the user device 200 may maintain the location of the face of the subject within the central region block. If the location of the face of the subject is changed during video recording, the user device 200 may rotate the motor 121 of the mobile device cradle 100. After discovering the face of the subject, the user device 200 may display a face recognition mark FC on the face of the subject within the screen. The user device 200 may rotate the motor 121 of the mobile device cradle 100 so that the face recognition mark FC is located in the central region block CA.

The user may end the shooting by touching or clicking a shoot end button VB2.

In this case, the user device 200 may automatically end the shooting when the video shooting progress time reaches a video shooting length preset by the user after the video shooting has started.

Figure 7:
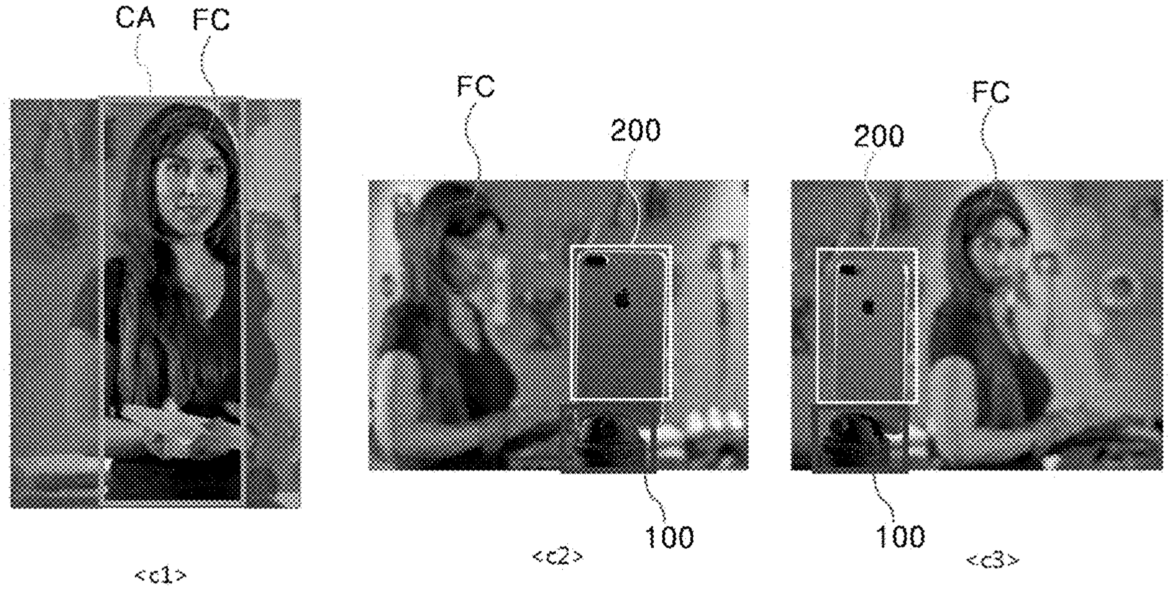
FIG. 7 is a view for illustrating an example of the face tracking function of FIG. 6.

FIG. 7 is a view for illustrating an example of the face tracking function of FIG. 6.

Referring to FIGS. 1 and 3, and <c1> of FIG. 7, the user device 200 may automatically extract the face of the subject. The user device 200 may display a face recognition mark FC on the face of the subject extracted. The user device 200 may rotate the motor 121 of the mobile device cradle 100 so that the face recognition mark FC for the subject is displayed in the central region block CA.

Referring to <c2>, it can be seen that the subject has moved to the left. The user device 200 may rotate the motor 121 of the mobile device cradle 100 in the left direction based on the control signal. As the motor 121 of the mobile device cradle 100 rotates, the user device 200 may rotate to the left. The user device 200 may display the face recognition mark FC on the face of the subject, and rotate the motor 121 of the mobile device cradle 100 so that the face recognition mark FC is displayed in the central region block.

Referring to <c3>, it can be seen that the subject has moved to the right. The user device 200 may display the face recognition mark FC on the face of the subject, and rotate the motor 121 of the mobile device cradle 100 to the right so that the face recognition mark FC is displayed in the central region block. As the motor 121 of the mobile device cradle 100 rotates, the user device 200 may also rotate along to proceed with shooting a video.

Figure 8:
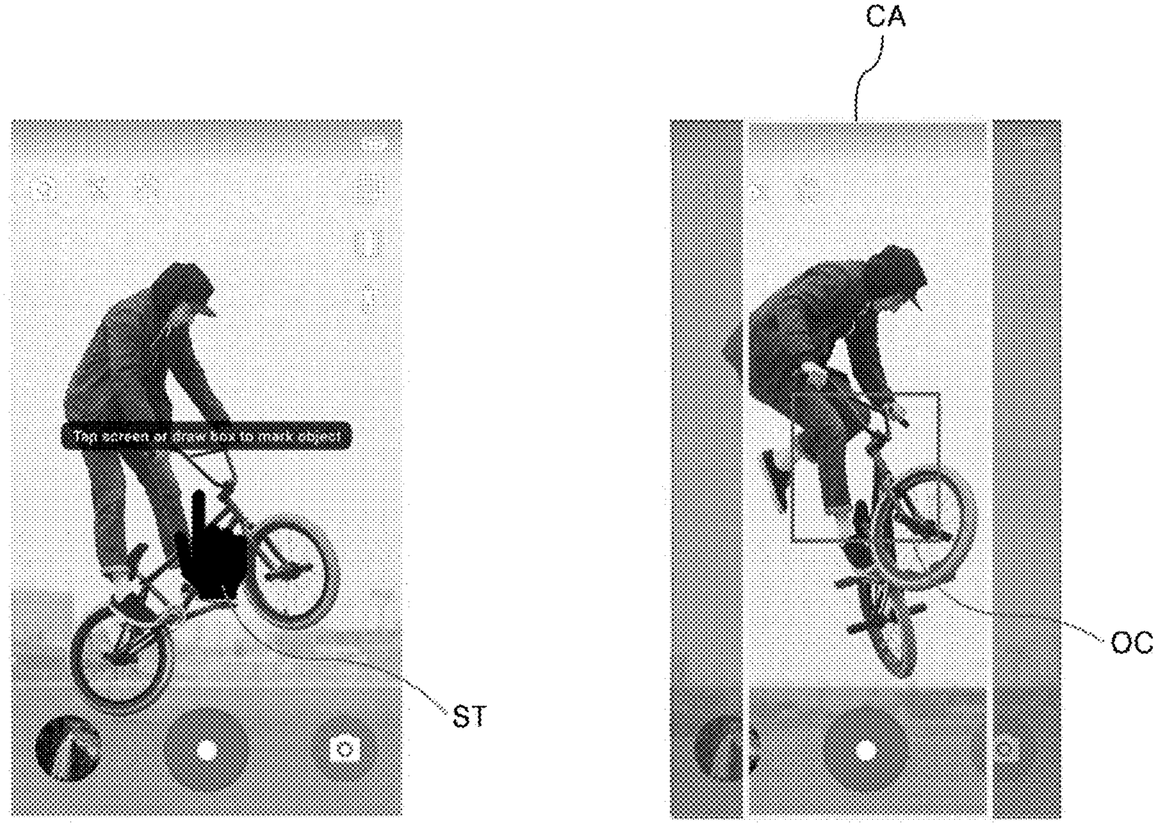
FIG. 8 is a view for illustrating an action tracking function of a mobile device cradle in accordance with an embodiment of the described technology.

FIG. 8 is a view for illustrating an action tracking function of a mobile device cradle in accordance with an embodiment of the described technology.

Referring to FIGS. 1 and 3, and <d1> of FIG. 8, the user may set a subject to be extracted by touching the subject in the action tracking photographing screen or by drawing a figure (e.g., a square or circle) or the like at a feature point of the subject to be extracted.

The user device 200 may extract a feature point of the subject received as input.

Referring to <d2>, the user device 200 may display a subject recognition mark OC on the feature point of the subject extracted. The user device 200 may rotate the motor 121 of the mobile device cradle 100 so that the subject recognition mark OC is located within the central region block CA.

For example, if the user sets the leg of a person performing a bicycle stunt as a feature point, the user device 200 may display a subject recognition mark OC on the leg of the person. Next, if the leg of the person moves to the right, the user device 200 may rotate the motor 121 of the mobile device cradle 100 to the right. The user device 200 may display the subject recognition mark OC, and then stop the rotation of the motor 121 of the mobile device cradle 100 when the subject recognition mark OC moves into the central region block CA.

Figure 9:
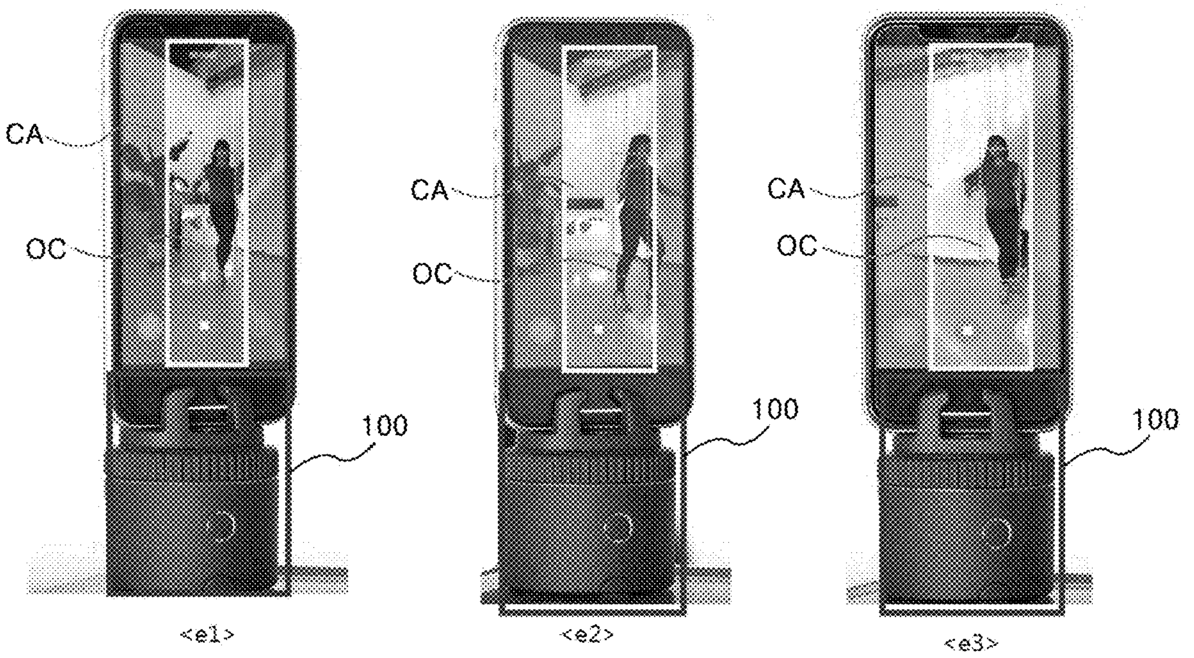
FIG. 9 is a view for illustrating an example of the action tracking function of FIG. 8.

FIG. 9 is a view for illustrating an example of the action tracking function of FIG. 8.

Referring to FIGS. 1 and 3, and <e1> of FIG. 9, the user device 200 may display a subject recognition mark OC on the body of a subject. The user device 200 may rotate the motor 121 of the mobile device cradle 100 so that the subject recognition mark OC is located within the central region block CA.

Referring to <e2>, the user device 200 is shooting an image of the subject moving to the right. The user device 200 may rotate the motor 121 of the mobile device cradle 100 to the right so that the subject recognition mark OC is located within the central region block CA.

Referring to <e3>, it can be confirmed that as the user device 200 rotates the motor 121 of the mobile device cradle 100, the subject recognition mark OC of the subject moved to the right is located in the central region block CA. When the direction of the mobile device cradle 100 in <e1>, <e2>, and <e3> is checked, it can be confirmed that the user device 200 has rotated the rotating module 110 of the mobile device cradle 100 to the right.

Figure 10:
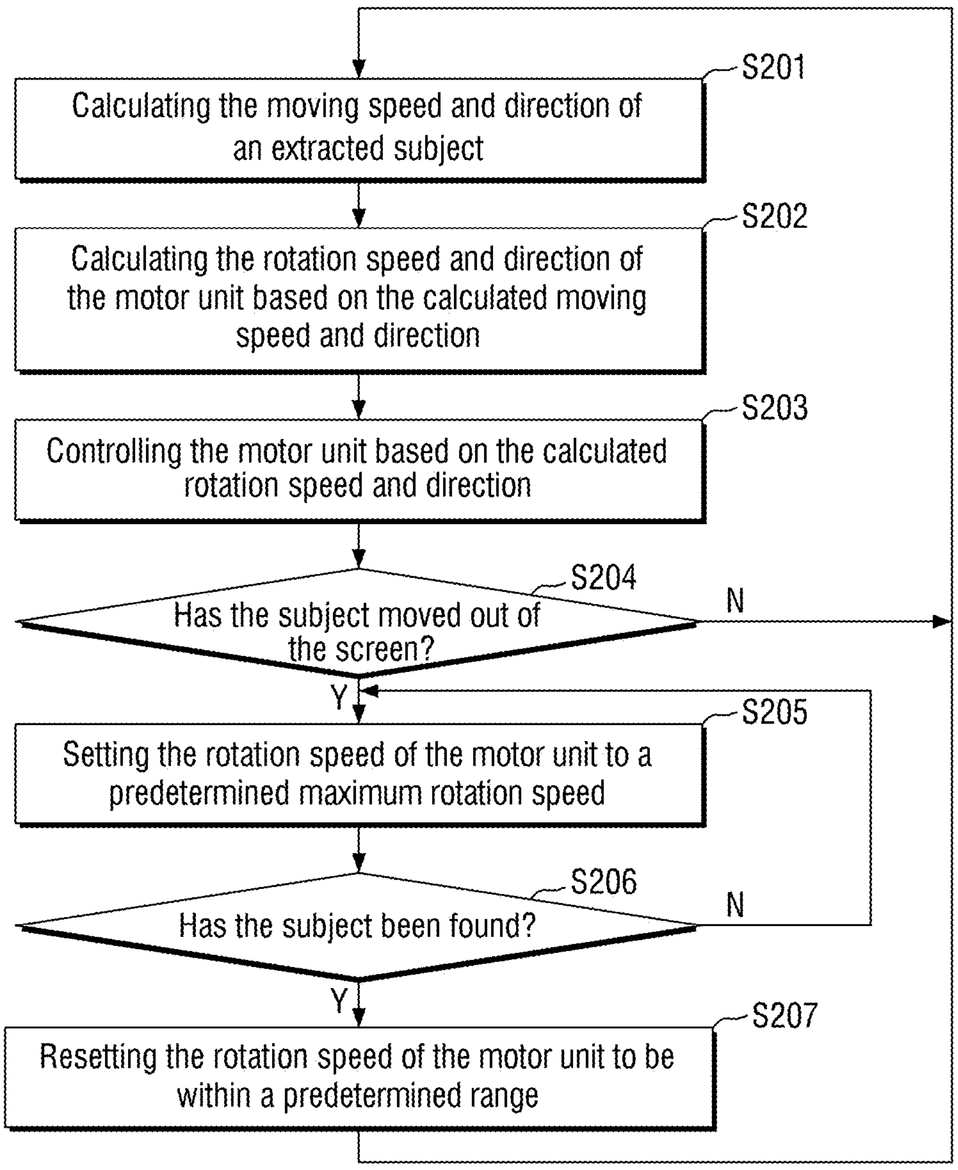
FIG. 10 is a flowchart for illustrating a method for controlling a mobile device cradle in accordance with another embodiment of the described technology.

FIG. 10 is a flowchart for illustrating a method for controlling a mobile device cradle in accordance with another embodiment of the described technology.

Referring to FIGS. 1, 3, and 10, the user device 200 calculates the moving speed and direction of an extracted subject (S201).

At this time, the user device 200 may display a subject recognition mark on the subject. The user device 200 may calculate the moving speed and direction of the subject by calculating the moving speed and direction of the subject recognition mark.

The user device 200 calculates the rotation speed and direction of the motor 121 based on the calculated moving speed and direction (S202).

At this time, the calculated moving speed and direction data may be transmitted to the controller in the mobile device cradle 100, and the controller 122 may generate a control signal based thereon.

The user device 200 controls the motor 121 based on the calculated rotation speed and rotation direction (S203).

In this case, the user device 200 may control the rotation direction, variable speed, etc., of the motor 121 by transmitting the control signal to the motor 121.

The user device 200 checks whether the subject has moved out of the screen (S204).

If the subject has not moved out of the screen, the user device 200 repetitively performs steps S201 to S204.

On the other hand, if the subject has moved out of the screen, the user device 200 sets the rotation speed of the motor 121 to a predetermined maximum rotation speed (S205). As an example, the user device 200 may set the rotation direction of the motor 121 to be the same as the direction in which the subject has moved out, based on the moving direction of the subject extracted above. The user device 200 may rotate the rotating module 110 of the mobile device cradle 100 by controlling the rotation speed of the motor 121 at a predetermined maximum rotation speed.

In this case, the user may set ON/OFF for the operation of setting the motor 121 at the predetermined maximum rotation speed when the subject moves out of the photographing screen, via the user interface of the application. If the user sets ON, the motor 121 may rotate at the predetermined maximum rotation speed in the direction in which the subject has moved out when the subject has moved out of the photographing screen. On the other hand, if the user sets OFF, the motor 121 may rotate while maintaining the current rotation speed in the direction in which the subject has moved out.

The user device 200 checks whether the subject has been found (S206).

If the subject has not been found, the user device 200 repetitively performs steps S205 to S206.

On the other hand, if the subject that had moved out of the photographing screen has been found, the user device 200 resets the rotation speed of the motor 121 to be within a predetermined range (S207).

Once the rotation speed of the motor 121 has been reset, the user device 200 repetitively performs steps S201 to S207.

Figure 11:
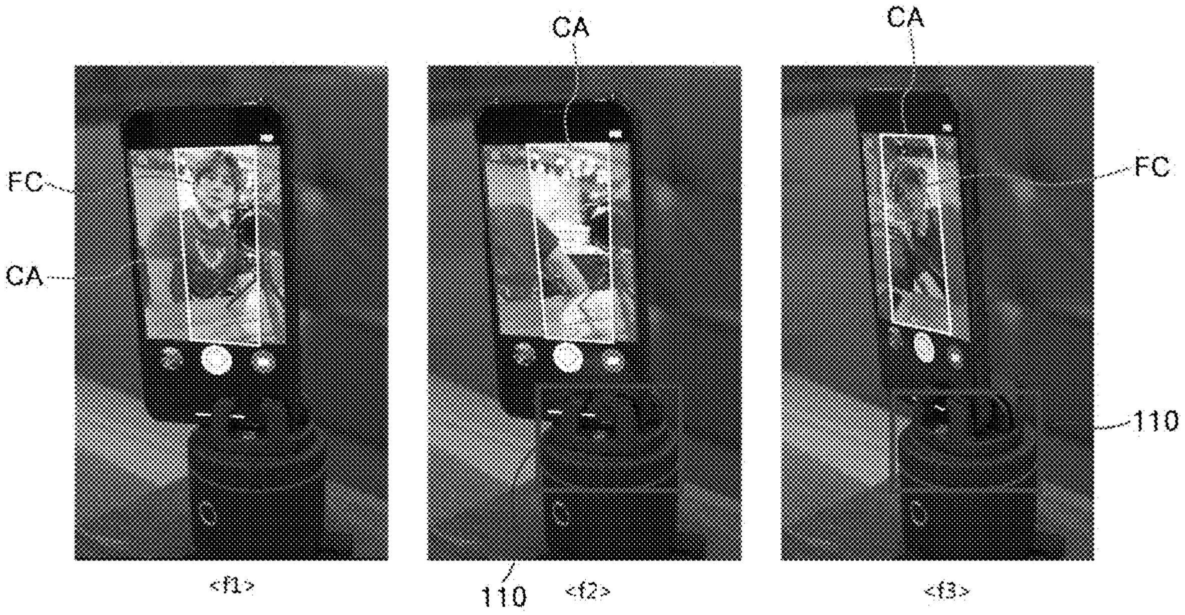
FIG. 11 is a view for illustrating an example of a method of discovering and shooting a deviated subject in the method for controlling the mobile device cradle of FIG. 10.

FIG. 11 is a view for illustrating an example of a method of discovering and shooting a deviated subject in the method for controlling the mobile device cradle of FIG. 10

Referring to FIGS. 1 and 3, and <f1> of FIG. 11, the user device 200 may display a subject recognition mark FC on the face of the subject extracted. The user device 200 may calculate the moving direction, moving speed, etc., of the subject by using the subject recognition mark FC. The user device 200 may position the subject recognition mark FC in the central region block CA set by the user by controlling the motor 121 based on the calculated data.

Referring to <f2>, it can be confirmed that the extracted subject has moved out of the left side of the screen and the subject is not recognized on the screen. At this time, the user device 200 may generate a control signal for the motor 121 based on the moving direction and the moving speed of the subject calculated before the subject deviated. The user device 200 may set the rotation direction of the motor 121 to the left and set the rotation speed to the maximum via the control signal. Next, as the motor 121 is being controlled, the rotating module 110 may rotate toward the left at the maximum speed.

Referring to <f3>, the user device 200 can discover the face of the subject and display the subject recognition mark FC thereon.

At this time, the user device 200 may control the motor 121 to rotate the rotating module 110 until the face of the subject is found. If the subject has been found, the user device 200 may display the subject recognition mark FC thereon and then rotate the rotating module 110 so that the subject recognition mark FC is located within the central region block CA.

Figure 12:
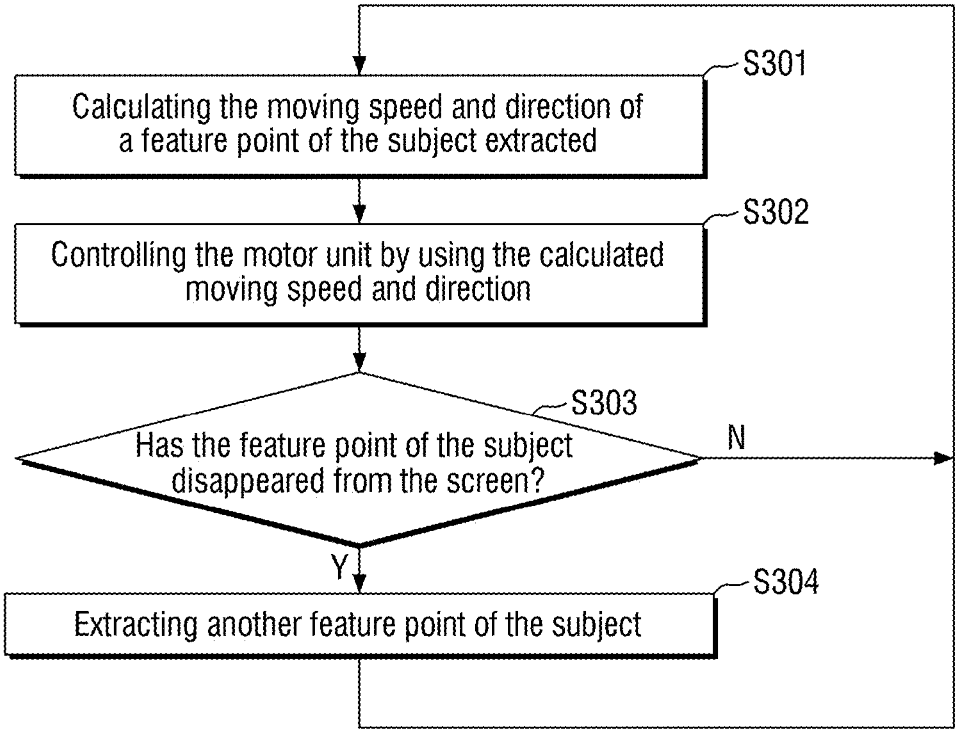
FIG. 12 is a flowchart for illustrating a method for controlling a mobile device cradle in accordance with yet another embodiment of the described technology.

FIG. 12 is a flowchart for illustrating a method for controlling a mobile device cradle in accordance with yet another embodiment of the described technology.

Referring to FIGS. 1, 3, and 12, the user device 200 calculates the moving speed and moving direction of a feature point of the subject extracted (S301).

At this time, the feature point of the subject extracted may be set automatically by the user device 200, or may be set by touching or clicking directly by the user. Further, the user device 200 may display a feature point recognition mark on the feature point of the subject extracted.

The user device 200 calculates the rotation speed and direction of the motor 121 based on the calculated moving speed and moving direction and controls the motor 121 (S302).

At this time, the user device 200 may control the motor 121 via the control signal generated by the controller 122.

The user device 200 determines whether the feature point of the subject has disappeared from the screen (S303).

At this time, if the feature point of the subject is present on the screen, the user device 200 repetitively performs steps S401 to S403.

On the other hand, if the feature point of the subject has disappeared from the screen, the user device 200 extracts another feature point of the subject (S304).

At this time, another feature point of the subject may be extracted automatically by the user device 200 or may be set directly by the user. When another feature point is extracted, the user device 200 may display a subject recognition mark thereon and rotate the rotating module 110 so that the subject is located within a set location region block.

The user device 200 may repetitively perform steps S301 to S303 described above.

Figure 13:
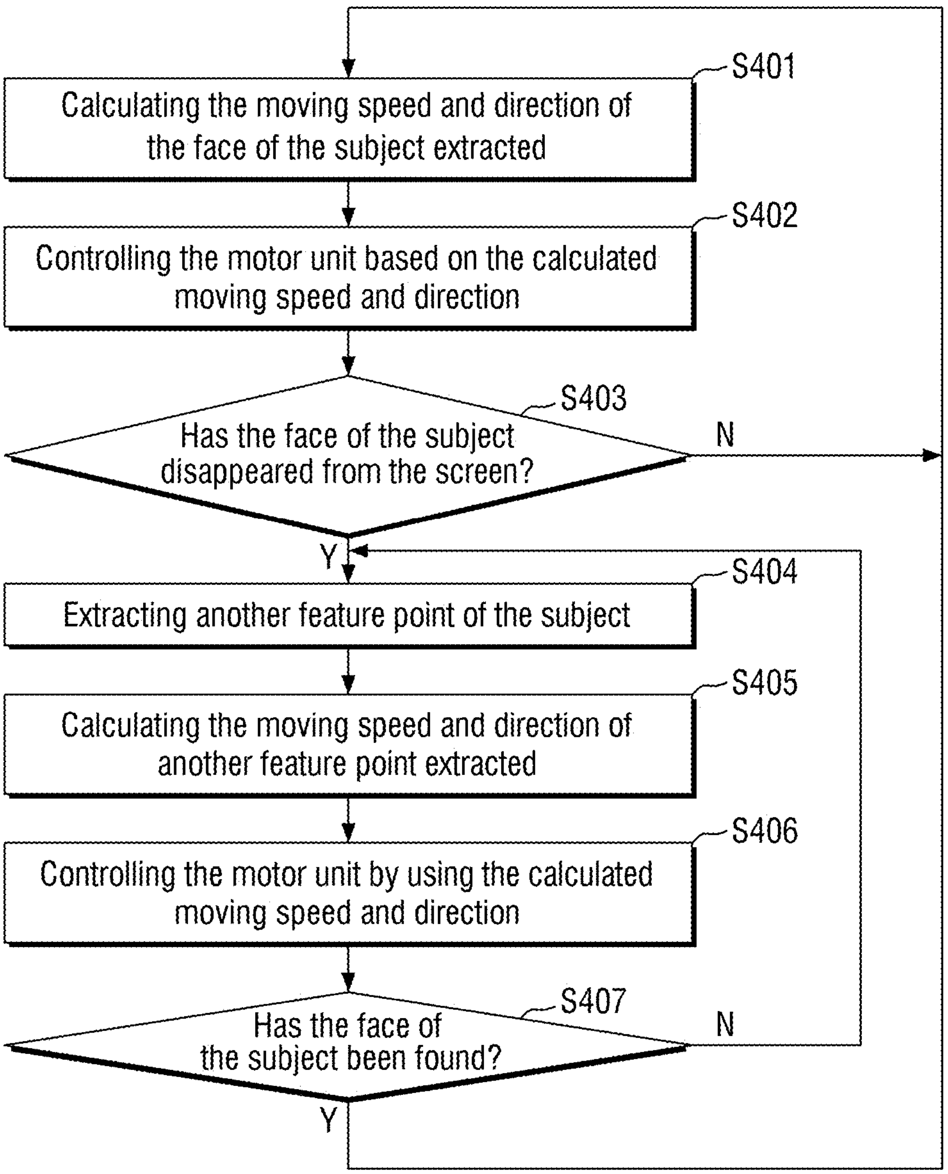
FIGS. 13 and 14 are views for illustrating an example of the method for controlling the mobile device cradle of FIG. 12.
Figure 14:
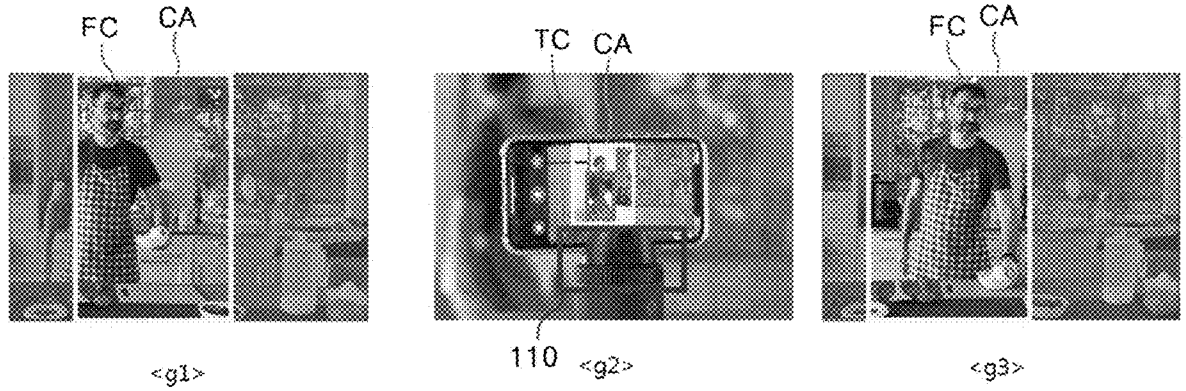

FIGS. 13 and 14 are views for illustrating an example of the method for controlling the mobile device cradle of FIG. 12.

Referring to FIGS. 1, 3, and 13, the user device 200 calculates the moving speed and direction of the face of the subject extracted (S401).

In this case, the user may extract the face of the subject as a feature point by clicking or touching the face of the subject within the photographing screen. In addition, the user device 200 may display a face recognition mark on the face of the subject extracted.

In this case, the face of the subject extracted first may be set as a default extraction value.

The user device 200 controls the motor 121 by using the calculated moving speed and direction (S402).

The user device 200 checks whether the face of the subject has disappeared from the screen (S403).

At this time, if the face of the subject is present in the screen, the user device 200 repetitively performs steps S401 to S403.

On the other hand, if the face of the subject has disappeared from the screen, the user device 200 extracts another feature point of the subject (S404).

At this time, the user device 200 may automatically extract another body part, an object, a part in motion, etc., adjacent to the face included in the subject as another feature point. Alternatively, another feature point may be set by clicking or touching directly by the user. In addition, the user device 200 may display a feature point recognition mark on another feature point extracted.

The user device 200 calculates the moving speed and moving direction of another feature point extracted (S405).

The user device 200 controls the motor 121 by using the calculated moving speed and moving direction of the re-extracted feature point (S406).

At this time, the user device 200 may automatically search for the face of the subject face, which is a default extraction value.

The user device 200 checks whether the face of the subject has been found (S407).

At this time, if the face of the subject has not been found in the screen, the user device 200 repetitively performs steps S404 to S407.

At this time, if the face of the subject has been found in the screen, the user device 200 may stop extracting another feature point and first recognize and extract the face of the subject face, which is the default extraction value, as the feature point. The user device 200 may display a face recognition mark on the face of the subject extracted.

The user device 200 repetitively performs steps S401 to S407.

Referring to FIGS. 1, 3, and 14, a video photographing screen using a method for extracting another feature point of a subject of the user device 200 and controlling the same is shown.

Referring to <g1> of FIG. 14, the user device 200 may display the face recognition mark FC on the face of the subject extracted. Further, the user device 200 may rotate the rotating module 110, to thereby position the face recognition mark FC in the central region block CA.

Referring to <g2>, it can be seen that the face of the subject extracted has moved to the left, and the face of the subject extracted and the face recognition mark has disappeared from the screen. The user device 200 may control the motor 121 of the mobile device cradle 100 based on the moving speed and moving direction calculated while the face of the subject extracted is being is recognized. With the rotation of the motor 121, the rotating module 110 may rotate to the left.

At this time, if the face of the subject extracted has disappeared, the user device 200 may extract the torso of the subject as another feature point. After extracting another feature point of the subject, the user device 200 may display the body recognition mark TC on the torso of the subject.

The torso of the subject may continue to move to the right. The user device 200 may continue to rotate the rotating module 110 so that the torso of the subject is located within the central region block CA.

Referring to <g3>, after discovering the face of the subject extracted, the user device 200 may display the face recognition mark FC by resetting the extracted feature point of the subject to the face.

The user device 200 may control the motor 121 so that the face of the subject extracted is located within the central region block CA.

Meanwhile, an image combination method and a system for performing the same in accordance with an embodiment of the described technology will be described in the following.

Figure 15:
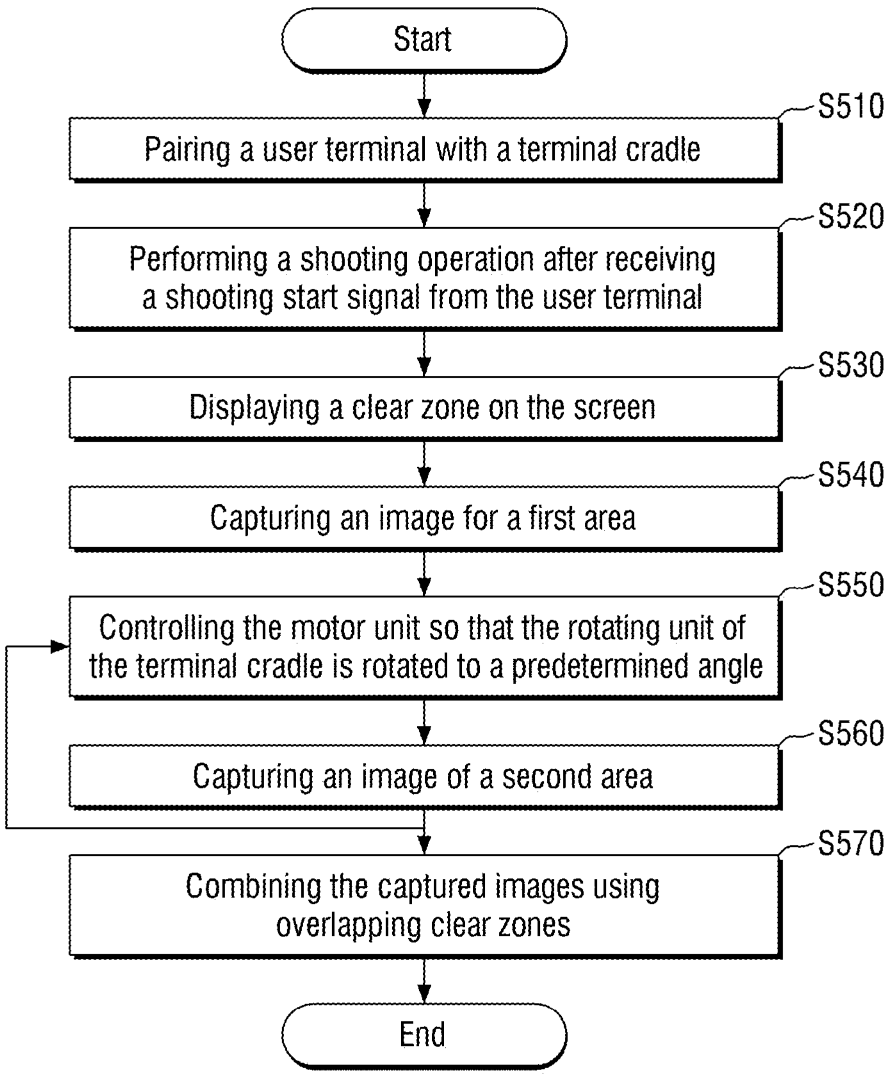
FIG. 15 is a flowchart for illustrating an operation method of an image combination system in accordance with an embodiment of the described technology.

FIG. 15 is a flowchart for illustrating an operation method of an image combination system in accordance with an embodiment of the described technology.

Referring to FIGS. 1, 14, and 15, in the image combination system in accordance with an embodiment of the described technology, the user first pairs the mobile device cradle 100 with the user device 200 (S510).

At this time, the user device 200 may transmit and receive signals and data to and from the mobile device cradle 100 and the device server 300 using Bluetooth, Wi-Fi, data, etc., based on an application installed in advance.

The image combination system performs a shooting operation after receiving a shooting start signal from the user device 200 (S520).

At this time, the user may select a desired type of shooting, such as face tracking, action tracking, 50:50, etc., by using an application installed in advance. The user may start shooting by selecting a manual mode or automatic mode.

When the shooting starts, the image combination system displays a clear zone on the photographing screen of the user device 200 (S530).

At this time, the clear zone may be displayed on one side or opposite sides of the photographing screen, and the location and size may vary based on the input of the user.

At this time, the clear zone may be displayed in dots, lines, shades, etc., on the screen of the user device 200. Further, after checking the clear zone, the user may plan the location, composition, etc. of the subject to be captured.

The user device 200 captures an image for a first area (S540).

At this time, the image combination system may convey the moments of shooting start and end for each area to the user by firing a flash or making a sound through the user device 200.

Next, when the image capturing for the first area is completed, the image combination system controls the motor 121 so that the rotating module 110 of the mobile device cradle 100 is rotated to a predetermined angle (S550).

As an example, the image combination system may rotate the rotating module 110 of the mobile device cradle so that the user device 200 is directed toward a second area based on an angle preset through a user interface.

The user device 200 captures an image of the second area (S560).

In this case, the image combination system repetitively performs steps S550 to S560 until all the areas preset using the application by the user are captured.

Next, when the shooting for all the areas is completed, the image combination system combines the captured images using overlapping clear zones (S570).

In this case, the captured images may each include a clear zone area.

As an example, the control server 300 may receive the captured image and data via the user device 200. The control server 300 may derive clear zone areas that are common in the captured images. The control server 300 may combine the images by overlapping the clear zone areas that are common in the images.

In the following, a 50:50 technique that combines captured images and moving images and presents them in a single moving image will be described in detail.

Figure 16:
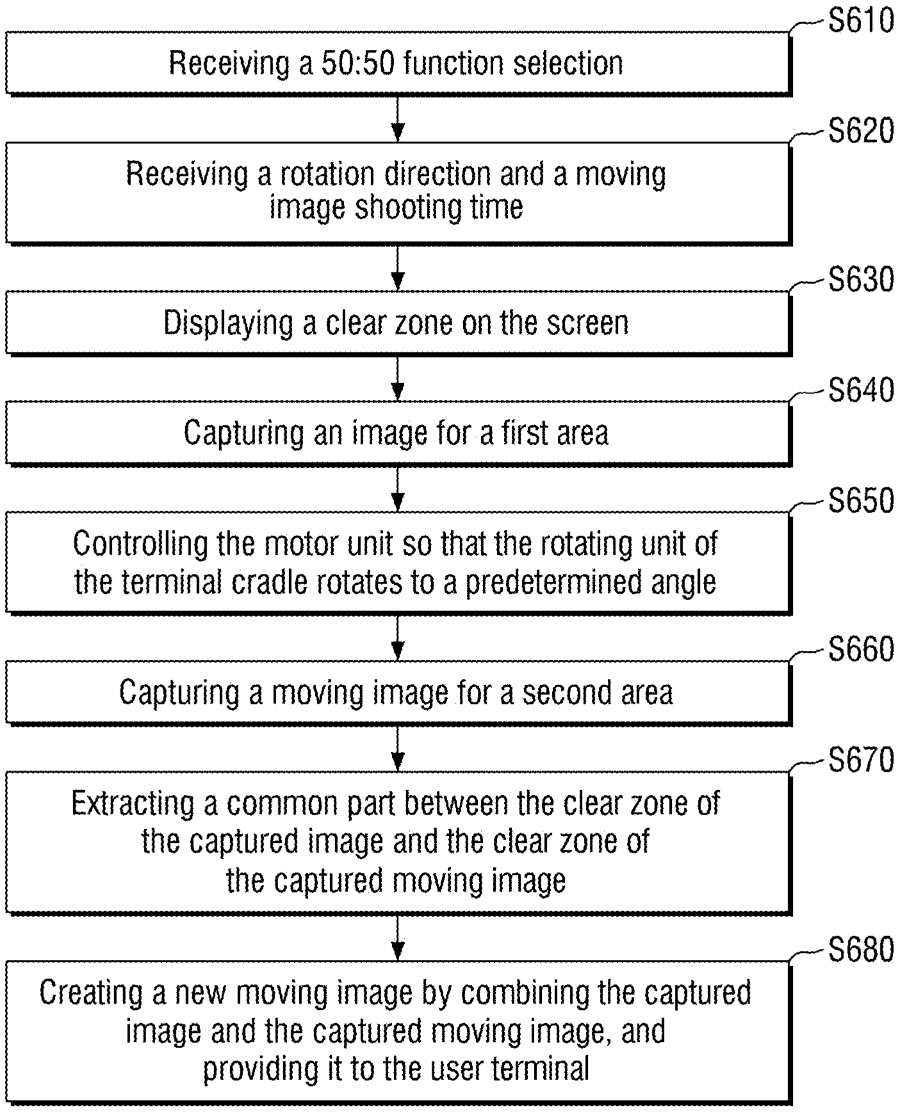
FIG. 16 is a flowchart for illustrating an operation method of a 50:50 function of an image combination system in accordance with an embodiment of the described technology.

FIG. 16 is a flowchart for illustrating an operation method of a 50:50 function of an image combination system in accordance with an embodiment of the described technology.

Referring to FIGS. 14 and 16, the image combination system receives a 50:50 function selection via the user device 200 (S610).

The image combination system receives the rotation direction of the mobile device cradle 100 and a moving image shooting time (S620).

As an example, the user may directly set the rotation direction (e.g., clockwise direction, counterclockwise direction) and rotation angle of the motor 121 included in the mobile device cradle 100, and the moving image shooting time using the user interface.

The image combination system displays a clear zone on the photographing screen of the user device 200 (S630).

At this time, the clear zone may vary in its location and size displayed according to the rotation angle and rotation direction of the motor 121 according to the input of the user. The user device 200 captures an image for a first area (S640).

At this time, the image of the first area may include a still image. The image combination system controls the motor 121 so that the rotating module 110 of the mobile device cradle 100 rotates to a predetermined angle (S650).

As an example, the image combination system may generate a control signal for the motor 121 based on an angle preset through a user interface. Next, based on the control signal received, the motor 121 may rotate the motor 121 so that the user device 200 is directed toward a second area. As the motor 121 rotates, the rotating module 110 connected to the motor 121 may also rotate.

The user device 200 captures a moving image for the second area (S660).

At this time, the user may shoot a moving image that moves automatically or manually. For example, if an automatic mode is set, the user device 200 may shoot a moving image based on a moving image shooting length preset via the user interface. In addition, if a manual mode is set, the user may proceed manually with a shooting start and a shooting end by using a remote controller. The image combination system extracts a common part between the clear zone of the captured image and the clear zone of the captured moving image (S670).

At this time, the image combination system may extract a common part between the clear zone of the image and the clear zone of the moving image based on the angle at which the mobile device cradle 100 is rotated.

The image combination system creates a new moving image by combining the captured image and the captured moving image, and provides it to the user device 200 (S680).

As an example, the image combination system may generate a new moving image by merging a first area and a second area in which a still image is arranged on one side and a moving image is arranged on the other side around the common part of the clear zones.

In this case, the user may set a section in the captured moving image to be used for combination. The image combination system may combine the captured image and the moving image section set by the user and present it as a single moving image.

Figure 17:
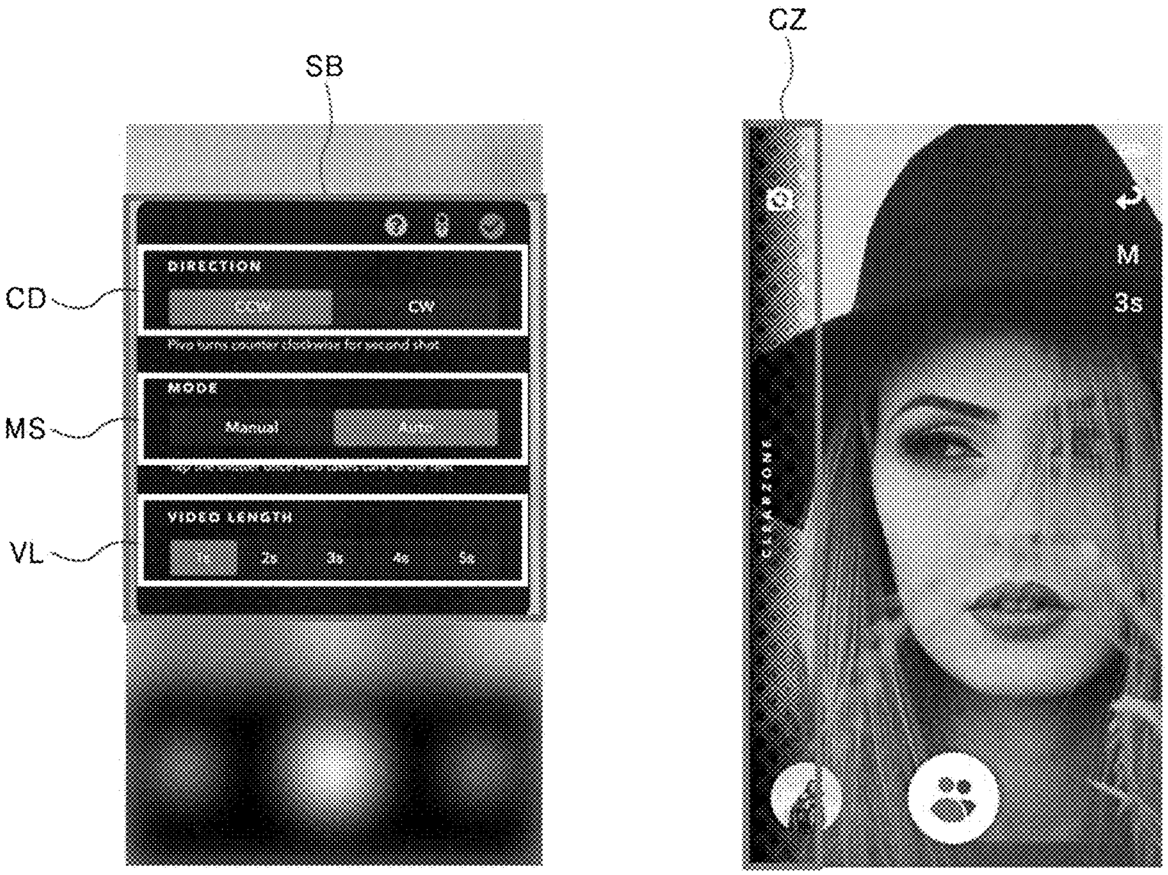
FIG. 17 is a view showing an interface for a 50:50 function of an image combination system in accordance with an embodiment of the described technology.

FIG. 17 is a view showing an interface for a 50:50 function of an image combination system in accordance with an embodiment of the described technology.

Referring to FIGS. 1 and 14, and <h1> of FIG. 17, if the user touches the 50:50 function photographing screen or swipes and clicks a setting button, the image combination system may display a 50:50 function setting pop-up window SB. The 50:50 function setting pop-up window SB may include a shooting direction menu CD, a shooting mode menu MS, a moving image shooting length menu VL, etc. The user may use the 50:50 function setting pop-up window SB to set the shooting direction, shooting mode, moving image shooting time, etc., for the 50:50 function.

The user may use the shooting direction menu CD to set the shooting direction of images and moving images.

For example, if the user selects a CCW (hereinafter, counterclockwise) button, the motor 121 may rotate in a counterclockwise direction. If the mobile device cradle 100 paired with the user device 200 rotates counterclockwise, the user device 200 may rotate counterclockwise like the rotating module 110 of the mobile device cradle 100 to capture images and moving images. At this time, the motor 121 may rotate to an angle preset via the 50:50 function setting pop-up window SB.

On the other hand, if the user selects a CW (hereinafter, clockwise) button, the motor 121 may rotate in a clockwise direction. As the rotating module 110 connected to the motor 121 rotates in a clockwise direction, the user device 200 may rotate in a clockwise direction to capture images and moving images.

In addition, the user may use the shooting mode menu MS to set a manual shooting mode or an automatic shooting mode.

The user may select a Manual (hereinafter, a manual shooting mode) or Auto (hereinafter, an automatic shooting mode) button in the shooting mode menu MS. However, the present embodiment is not limited thereto.

If the user selects the automatic shooting mode, the user device 200 may automatically perform shooting.

For example, when the user device 200 completes the automatic shooting of the image in a first area, the motor 121 may rotate in a preset direction and angle. When the rotation of the motor 121 and the rotating module 110 is completed, the user device 200 may automatically perform shooting a moving image for a second area.

If the user selects the manual shooting mode, the user may perform shooting by directly touching or clicking a shooting button or using a remote controller.

For example, in a state where the user device 200 and the mobile device cradle 100 are positioned toward the first area, the user may manually perform shooting an image by using a remote controller shooting button or by directly touching or clicking the shooting button on the photographing screen. When the shooting of the first area is completed, the user may rotate the motor 121 in a preset direction and angle by selecting a rotation button in the remote controller and on the photographing screen. At this time, when the rotation of the motor 121 and the rotating table 110 is completed, the user may start shooting a moving image by selecting the shooting button in the remote controller and on the photographing screen. The user may end shooting the moving image by clicking the shooting button again.

However, the described technology is not limited thereto, and the motor 121 may automatically rotate based on a preset angle even if the button is not selected in the manual shooting mode.

Moreover, the user may use the moving image shooting length menu VL to set the length of a moving image to be captured.

For example, if the user selects a 1 s button, the user device 200 may automatically end shooting 1 second after the start of the moving image shooting.

The described technology is not limited thereto, and the shooting length of a moving image may include buttons for various times such as 10 s, 1 min, etc., and may be set by inputting directly by the user.

Referring to <h2>, a clear zone CZ may be displayed on the photographing screen of the user device 200. The clear zone CZ may be displayed in dots, lines, shades, etc., on the photographing screen.

The size (e.g., width, thickness, etc.) of the clear zone CZ may be changed according to the rotation angle of the motor 121.

For example, if the user sets the rotation angle of the motor 121 to be large, the common part between the first area image and the second area moving image decreases. At this time, the size of the clear zone CZ may be reduced. On the contrary, if the rotation angle is set to be small, the common part may increase, causing the size of the clear zone CZ to be enlarged.

Figure 18:
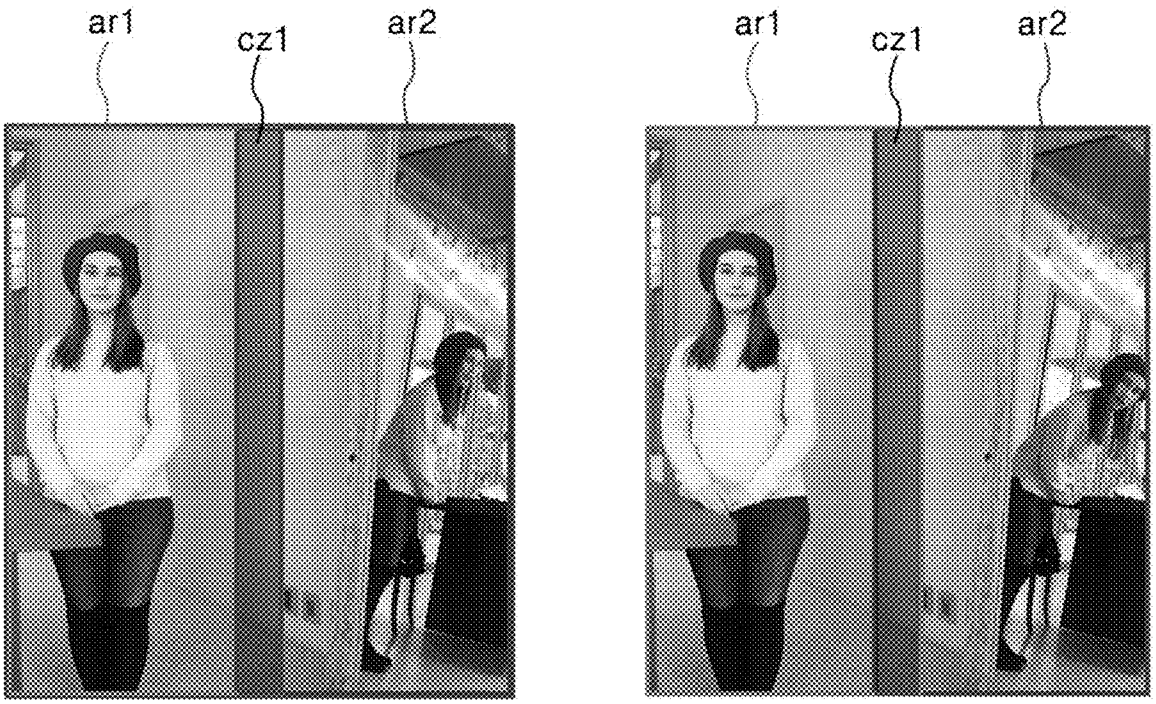
FIG. 18 is a view for illustrating an example of a 50:50 function of an image combination system in accordance with an embodiment of the described technology.

FIG. 18 is a view for illustrating an example of a 50:50 function of an image combination system in accordance with an embodiment of the described technology.

Here, <i1> of FIG. 18 shows one scene of a combined moving image, and <i2> shows another scene of the combined moving image.

Referring to FIG. 14 and <i1> of FIG. 18, the image combination system may combine a first area image ar1 and a second area moving image ar2 to present a single moving image.

The image combination system may arrange the first area image ar1 and the second area moving image ar2 side by side. The image combination system may extract a common clear zone cz1 of the first area image ar1 and the second area moving image ar2. The image combination system can combine so that the common clear zone cz1 of the first area image ar1 and the second area moving image ar2 overlaps.

Referring to <i2>, it can be confirmed that the first area image ar1 is the same as the first area image ar1 of <i1>. However, the scene can confirm that the subject of the second area moving image ar2 of <i2> expresses a different behavior from the subject of the second area moving image ar2 of <i1>.

Through this, the image combination system can provide pleasure to the user by combining an image and a moving image into one moving image using the 50:50 function.

In the following, a Many Me function of capturing multiple images and then combining the captured images based on clear zones to present one image will be described in detail.

Figure 19:
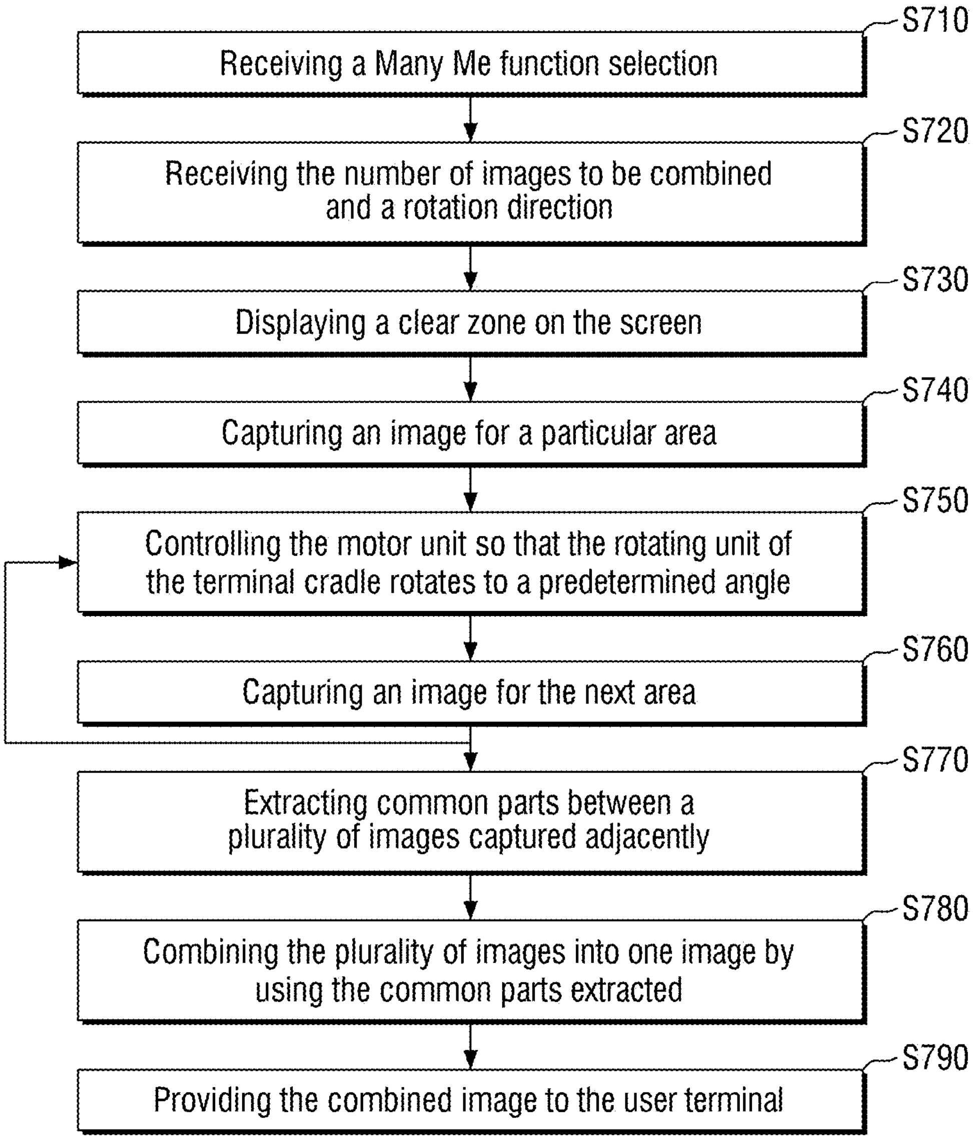
FIG. 19 is a flowchart for illustrating an operation method of a Many Me function of an image combination system in accordance with another embodiment of the described technology.

FIG. 19 is a flowchart for illustrating an operation method of a Many Me function of an image combination system in accordance with another embodiment of the described technology.

Referring to FIG. 19, the image combination system receives a Many Me function selection via an application installed in the user device 200 (S710).

The image combination system receives the number of images to be combined and a rotation direction (S720).

At this time, the image combination system may recommend or automatically set a rotation angle suitable for shooting the number of images set by the user.

The image combination system displays a clear zone on the screen (S730).

The user device 200 captures an image for a particular area (S740).

Next, after the shooting is completed, the image combination system controls the motor 121 so that the rotating module 110 of the mobile device cradle 100 rotates to a predetermined angle (S750).

As an example, the image combination system may rotate the rotating module 110 of the mobile device cradle 100 so that the user device 200 is directed toward the next area based on an angle preset via the user interface.

The user device 200 captures an image for the next area (S760).

In this case, the image combination system repetitively performs steps S750 to S760 until all of the number of images preset using the application by the user are captured.

Next, after all the shooting is finished, the image combination system extracts common parts between a plurality of images captured adjacently (S770).

At this time, the image combination system may extract common parts of clear zones of the plurality of images captured adjacently, based on the angle at which the motor 121 is rotated.

The image combination system combines the plurality of images into one image by using the common parts extracted (S780).

As an example, the image combination system may arrange the common parts of the plurality of images captured adjacently to overlap each other, so as to combine them into a single image.

The image combination system provides the combined image to the user device (S790).

Figure 20:
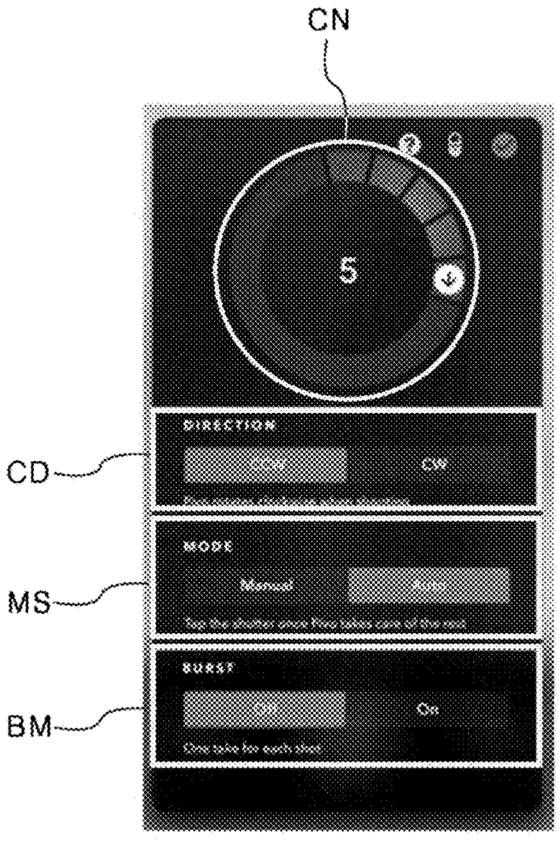
FIG. 20 is a view showing an interface for a Many Me function of an image combination system in accordance with another embodiment of the described technology.
Figure 20:
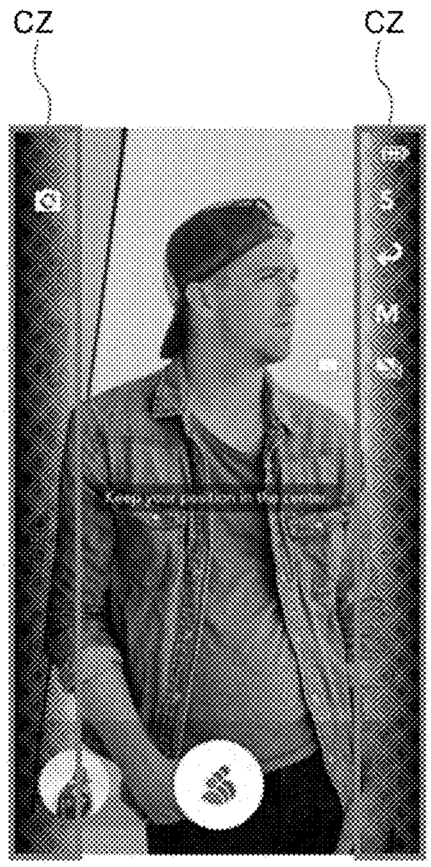

FIG. 20 is a view showing an interface for a Many Me function of an image combination system in accordance with another embodiment of the described technology.

Here, <j1> of FIG. 20 shows a Many Me function setting pop-up window, and <j2> shows a Many Me photographing screen.

Referring to FIG. 1 and <j1> of FIG. 20, if the user touches the Many Me function photographing screen or swipes and clicks the setting button, the image combination system may display the Many Me function setting pop-up window. The Many Me function setting pop-up window may include a combination number setting menu CN, a shooting direction menu CD, a shooting mode menu MS, a Burst mode menu BM, etc.

The user may set the number of images to be combined by using the combination number setting menu CN.

As an example, the user may set the number of images to be combined by touching or clicking the combination number setting menu CN as many as the number of images to be combined, or by inputting a number.

At this time, the image combination system may recommend or automatically set a rotation angle of the motor 121 suitable for the number of images to be combined set by the user.

Further, if the user inputs the rotation angle of the motor 121, the image combination system may recommend and automatically set the number of images to be combined suitable for the rotation angle.

The user may set an image shooting direction by using the shooting direction menu CD.

For example, if the user selects a CW (hereinafter, clockwise) button, the motor 121 may rotate in a clockwise direction. If the mobile device cradle 100 paired with the user device 200 rotates clockwise, the user device 200 may rotate clockwise like the mobile device cradle 100 to capture an image. At this time, the motor 121 may rotate to an angle preset via the Many Me function setting pop-up window.

On the other hand, if the user selects a CCW (hereinafter, counterclockwise) button, the motor 121 may rotate in a counterclockwise direction. As the motor 121 rotates in a counterclockwise direction, the rotating module 110 and the user device 200 may rotate in a counterclockwise direction to capture an image.

In addition, the user may set a manual shooting mode or an automatic shooting mode by using the shooting mode menu MS.

The user may select a Manual (hereinafter, a manual shooting mode) or Auto (hereinafter, an automatic shooting mode) button in the shooting mode menu MS.

If the user selects the automatic shooting mode, the user device 200 may automatically perform shooting.

For example, when the user device 200 completes the automatic shooting of the image in a particular area, the motor 121 may rotate in a preset direction and angle. After the rotation of the rotating module 110 of the mobile device cradle is completed, the user device 200 may automatically perform shooting an image for the next area.

If the user selects the manual shooting mode, the user may perform shooting by directly touching or clicking a shooting button or using a remote controller.

For example, in a state where the user device 200 and the mobile device cradle 100 are positioned toward a particular area, the user may manually perform shooting an image by using a remote controller shooting button or by directly touching or clicking the shooting button on the photographing screen. When the shooting of the particular area is completed, the user may rotate the motor 121 in a preset direction and angle by selecting a rotation button in the remote controller and on the photographing screen. At this time, after the rotation of the mobile device cradle 100 is completed, the user may proceed with shooting by using the shooting button in the remote controller and on the photographing screen.

The described technology is not limited thereto, and the motor 121 may automatically rotate based on a preset angle even if the user does not select the rotation button in the manual shooting mode.

Further, the user may set a Burst mode (hereinafter, a Burst mode) by using the Burst mode menu BM.

The image combination system may perform continuous shooting of images for each area using the Burst mode. Specifics regarding the Burst mode will be described in detail with reference to FIGS. 22 and 23.

Referring to <j2>, a clear zone CZ may be displayed on the photographing screen of the user device 200. The clear zone CZ may be displayed in dots, lines, shades, etc., on the photographing screen.

The size (e.g., width, thickness, etc.) of the clear zone CZ may be changed according to the rotation angle of the motor 121.

For example, if the user sets the rotation angle of the mobile device cradle 100 to be large, the common part between the particular area image and the next area image decreases. At this time, the size of the clear zone CZ may be reduced. On the contrary, if the rotation angle is set to be small, the common part may increase, causing the size of the clear zone CZ to be enlarged.

In addition, the image combination system may change the location at which the clear zone CZ is displayed according to the rotation direction of the mobile device cradle 100 and the shooting area.

Since the first image for the first area, which is the first shooting area, and the image for the last shooting area (e.g., the third image) can be combined with only one image, the clear zone CZ may be displayed only on one side and the other side of the photographing screen. In addition, since the images captured in other areas (e.g., the second image captured in the second area) except for the first captured image and the last captured image can be combined with a total of two images on both sides, clear zones CZ may be displayed on opposite sides on the photographing screen.

For example, the mobile device cradle 100 may receive a rotation direction to the right via the user interface. Next, when the user device 200 performs shooting for the first area at the first angle, the clear zone may be displayed on the right side, which is one side, of the photographing screen. When the user device 100 performs shooting for the second area at the second angle, the clear zone may be displayed on both sides on the photographing screen. Further, when the user device 100 proceeds with shooting for the third area at the third angle, the clear zone may be displayed on the left side, which is the other side, of the photographing screen. The images captured in the first area and the third area may be combined on both sides of the second image captured in the second area.

Figure 21:
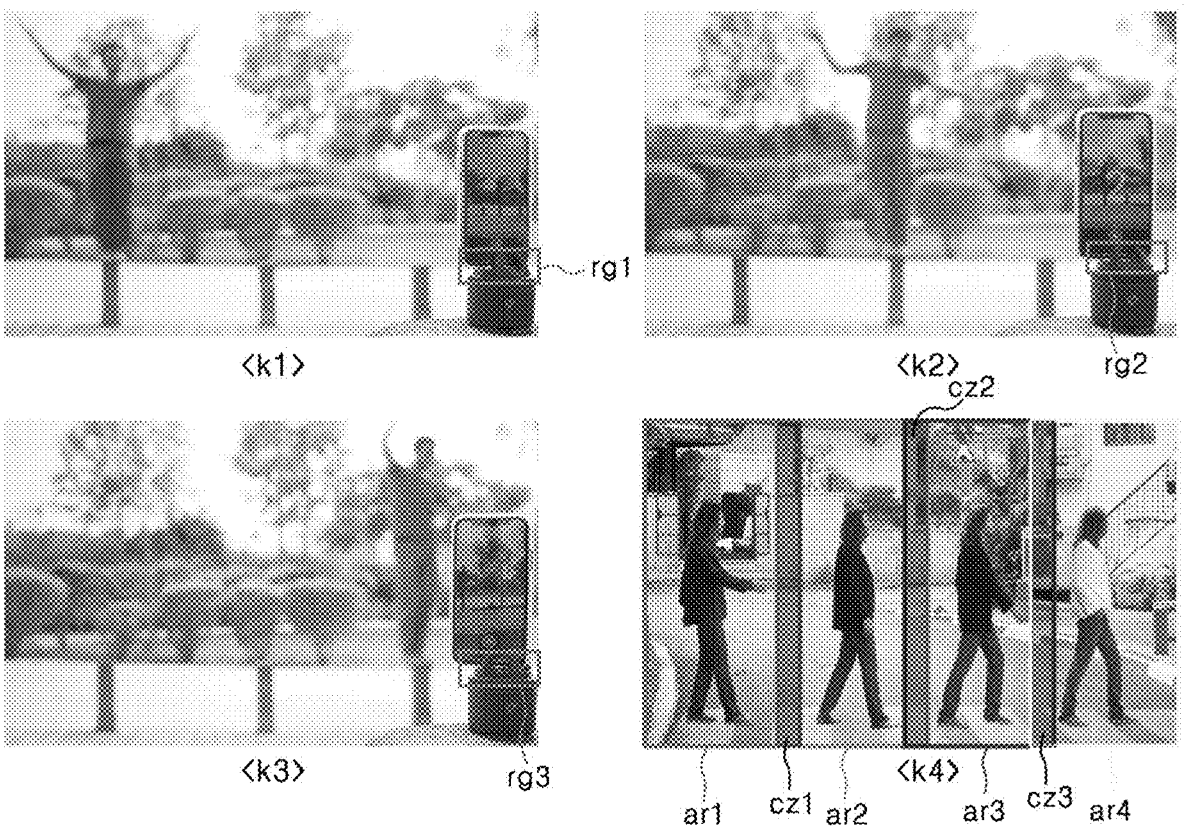
FIG. 21 is a view for illustrating an example of a Many Me function of an image combination system in accordance with another embodiment of the described technology.

FIG. 21 is a view for illustrating an example of a Many Me function of an image combination system in accordance with another embodiment of the described technology.

Here, <k1>, <k2>, and <k3> of FIG. 21 are views for illustrating a Many Me shooting process, and <k4> is a view showing a combined image after Many Me shooting.

Referring to FIG. 1 and <k1> of FIG. 21, the user may capture an image of a first area by using the mobile device cradle 100 and the user device 200. At this time, a clear zone may be displayed on one side of the photographing screen. After capturing the first image of the first area is completed, the motor 121 and the rotating module rg1 may rotate to a preset angle.

Next, referring to <k2> of FIG. 21, the mobile device cradle 100 rotated to a second angle may capture a second image of a second area by using the paired user device 200. At this time, clear zones may be displayed on both sides of the photographing screen. After capturing the second image is completed, the motor 121 and the rotating module rg2 may rotate to a preset angle.

Next, referring to <k3> of FIG. 21, it can be confirmed that the mobile device cradle 100 has automatically rotated to a third angle. The user device 200 may capture a third image of a third area at the third angle. At this time, clear zones may be displayed on both sides of the (photographing screen. After the shooting is completed, the motor 121 and the rotating module rg3 may be rotated to shoot for the next area.

Referring to <k4> of FIG. 21, the image combination system may combine a plurality of images into one image.

For example, the image combination system may combine a first image ar1, a second image ar2, a third image ar3, and a fourth image ar4 to present one image. At this time, the first image art may include a clear zone area on one side. The second image ar2 and the third image ar3 may include clear zone areas on both sides, and the fourth image ar4 may include a clear zone area on the other side. The image combination system may extract common parts of clear zones between a plurality of images captured adjacently.

The image combination system may extract a first clear zone cz1 that is a common clear zone part between the first image ar1 and the second image ar2. The image combination system may extract a second clear zone cz2 that is a common part between the second image ar2 and the third image ar3.

The image combination system may extract a third clear zone cz3 that is a common clear zone part between the third image ar3 and the fourth image ar4. The image combination system may combine the first image ar1 and the second image ar2 by superimposing the first clear zone cz1. The image combination system may combine the third image ar3 by superimposing the second clear zone cz2 on the image combined as above. The image combination system may combine the fourth image ar4 by superimposing the third clear zone cz3 on the image combined as above.

Through this, the image combination system makes it possible to combine a plurality of images into one image by using the Many Me function, thereby improving the convenience for users.

In the following, the Burst mode, which allows a plurality of photos to be captured for one area by using continuous shooting in the Many Me function, will be described in detail.

Figure 22:
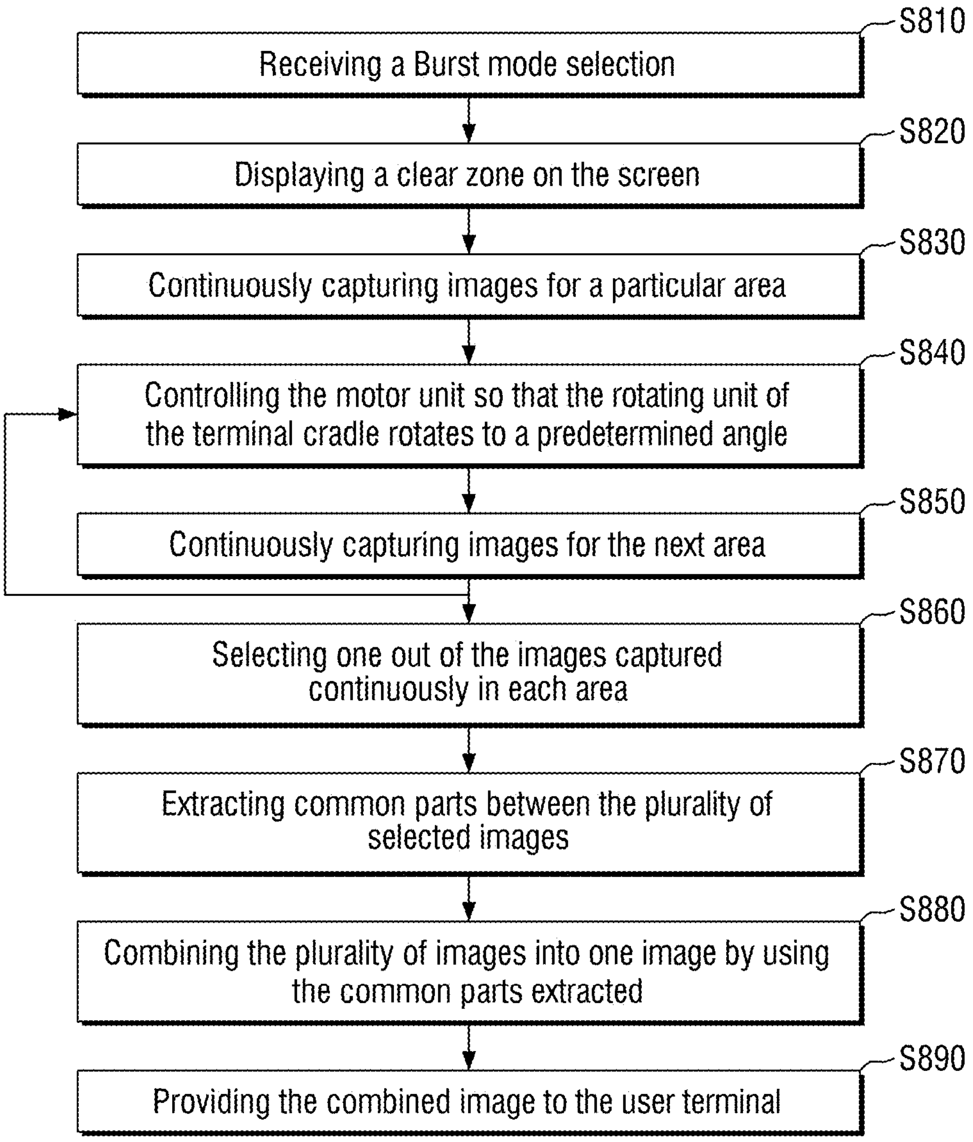
FIG. 22 is a flowchart for illustrating an operation method of a Burst mode function of an image combination system in accordance with yet another embodiment of the described technology.

FIG. 22 is a flowchart for illustrating an operation method of a Burst mode function of an image combination system in accordance with yet another embodiment of the described technology.

Referring to FIG. 22, the image combination system receives a Burst mode selection via the Many Me function setting pop-up window (S810).

At this time, the image combination system may receive the number of images to be combined, a rotation direction, a rotation angle, etc.

The image combination system displays a clear zone on the photographing screen (S820).

The user device 200 continuously captures images for a particular area (S830).

At this time, the user device 200 may proceed with continuous shooting for the number of shootings preset through the user interface.

Next, after the shooting is completed, the image combination system controls the motor 121 so that the rotating module of the mobile device cradle rotates to a predetermined angle (S840).

As an example, the image combination system may rotate the rotating module of the mobile device cradle 100 so that the user device 200 is directed toward the next area based on an angle preset via the user interface in the user device 200.

The user device 200 captures an image for the next area (S850).

In this case, the image combination system repetitively performs steps S840 to S850 until all the shooting areas preset using the application by the user are captured.

Next, after all the shooting is finished, the image combination system selects one out of the images captured continuously in each area (S860).

At this time, the image combination system may recommend and automatically select one image for each area by taking sharpness, subject shake, etc., into account. In addition, the user may check the photos captured continuously and select them directly.

The image combination system extracts common parts between the plurality of selected images (S870).

At this time, the image combination system may extract common parts in clear zones of the plurality of images captured adjacently, based on the angle at which the motor 121 is rotated.

The image combination system combines the plurality of images into one image by using the common parts extracted (S880).

As an example, the image combination system may arrange the common parts of the plurality of images captured adjacently to overlap each other, so as to combine them into a single image.

The image combination system provides the combined image to the user device (S890)

Figure 23:
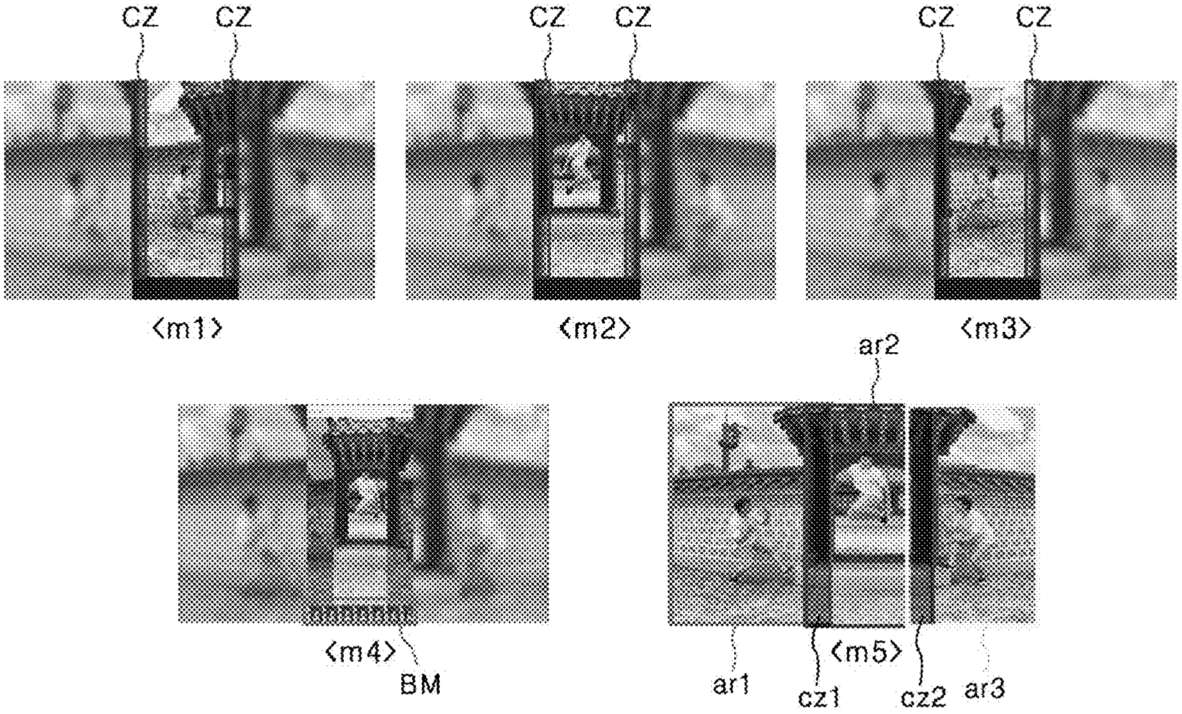
FIG. 23 is a view for illustrating an example of a Burst mode function of an image combination system in accordance with still another embodiment of the described technology.

FIG. 23 is a view for illustrating an example of a Burst mode function of an image combination system in accordance with still another embodiment of the described technology.

Here, <m1>, <m2>, and <m3> of FIG. 23 show a process of capturing images using the Burst mode function in the Many Me function, and <m4> shows a process of selecting images captured continuously. In addition, <m5> shows an image completed by combining the selected images.

Referring to FIG. 1 and <m1> of FIG. 23, the image combination system displays a photographing screen for capturing a first area image of the Many Me function by using the Burst mode function. The image combination system may display clear zones CZ on both sides of the photographing screen. The user device 200 may perform continuous shooting for the first area image as many times as the number of shootings set by the user. After the continuous shooting is completed, the image combination system may rotate the mobile device cradle 100 to a preset angle.

Referring to FIG. 1 and <m2> of FIG. 23, the image combination system displays a photographing screen for capturing a second area image of the Many Me function by using the Burst mode function. Clear zones CZ may be displayed on both sides of the photographing screen. The user device 200 may proceed with continuous shooting for the second area image as many times as the number of shootings set by the user.

The described technology is not limited thereto, and the user may set a continuous shooting progress time (e.g., 5 s), a continuous shooting progress interval (e.g., if 2 s is selected, one photo is captured for a particular area and then 2 s later, another photo is captured, etc.), and the like. When the continuous shooting for the second area is finished, the mobile device cradle 100 may rotate to a preset angle.

Referring to FIG. 1 and <m3> of FIG. 23, the image combination system displays a photographing screen for capturing a third area image of the Many Me function by using the Burst mode function. Clear zones CZ may be displayed on the photographing screen, and the user device 200 may proceed with continuous shooting based on a preset number of continuous shootings, a continuous shooting progress time, or the like.

Referring to <m4> of FIG. 23, the image combination system is a process of selecting one image out of the images captured continuously for the second area. When the continuous shooting for all areas is finished, the image combination system may provide continuously captured images for each area.

For example, if the user selects the second area within the screen of the user device 200, the image combination system may provide a list BM of the continuously captured images for the second area at the bottom of the screen. If the user touches or clicks on one image out of the continuously captured images, the image combination system may display on the screen the image touched by the user. The user can display the images on the screen by scrolling through the list BM of the continuously captured images or by touching them one by one. The user can consecutively click or touch and hold images to be used for combining out of the list BM of the continuously captured images, to thereby select them as combination images.

In addition, the image combination system may automatically select one image out of the continuously captured images. The image combination system may recommend or automatically select images to be used for combining out of the list of the continuously captured images by taking resolution, subject shake, etc., into account.

Referring to FIG. 1 and <m5> of FIG. 23, the image combination system may combine a plurality of images selected for each area and present it as one image. The image combination system may extract a first clear zone common part cz1 between the first area image ar1 and the second area image ar2. The image combination system may extract a second clear zone common part cz2 between the second area image ar2 and the third area image ar3. The image combination system may combine the first area image ar1, the second area image ar2, and the third area image ar3 by arranging the images so that the extracted clear zone common parts overlap. When the combining is completed, the image combination system may provide the combined image to the user device 200.

Through this, the image combination system can reduce the hassle of the user having to proceed with shooting again when a desired image has not been captured by making it possible to proceed with continuous shooting using the Burst mode in the Many Me function and then to extract the best image.

In summary, the image combination system in accordance with the described technology can provide multiple images as one image by extracting clear zone parts that are common between adjacent images and then combining the images so that the common parts overlap.

As described above, although the described technology has been described with limited embodiments and drawings, the described technology is not limited to the embodiments above and can be modified and changed in various ways from such a description by those of ordinary skill in the art to which the described technology pertains. Therefore, the spirit of the described technology should be understood only by the claims set forth below, and all equal or equivalent variations thereof are intended to fall within the scope of the spirit of the invention.

What is claimed is:

1. A method for controlling a mobile device cradle performed in an application of a user device linked with the mobile device cradle, the method comprising:

pairing the mobile device cradle with the user device;
starting capturing an image based on an input of a user;
extracting a subject from a captured image;
calculating a moving speed and a moving direction of the subject extracted; and
calculating a rotation speed and a rotation direction of a motor included in the mobile device cradle based on the calculated moving speed and moving direction, and controlling the motor based on the calculated rotation speed and rotation direction,
wherein the calculating a moving speed and a moving direction of the subject comprises:
calculating a moving speed and a moving direction of a feature point of the subject, and
if the feature point of the subject disappears from a photographing screen, re-extracting another feature point different from the feature point included in the subject, and calculating a moving speed and a moving direction of the re-extracted feature point.

2. The method for controlling a mobile device cradle of claim 1, wherein the controlling the motor comprises:

setting a region to position the subject based on the input of the user, and
changing the rotation speed and the rotation direction so that a location of the subject is maintained in the region.

3. The method for controlling a mobile device cradle of claim 1, wherein the controlling the motor comprises:

if the subject has moved out of a photographing screen, setting the rotation speed to a predetermined maximum rotation speed, and setting the rotation direction to be the same as the direction in which the subject has moved out.

4. The method for controlling a mobile device cradle of claim 3, wherein the controlling the motor comprises:

resetting the rotation speed to be within a predetermined range when the subject that has moved out from within the moving photographing screen is found.

5. The method for controlling a mobile device cradle of claim 3, further comprising:

providing a user interface capable of turning on or off an operation of setting the rotation speed to the predetermined maximum rotation speed if the subject has moved out of the photographing screen.

6. The method for controlling a mobile device cradle of claim 1, wherein the calculating a moving speed and a moving direction of the subject comprises:

recognizing a face of the user included in the subject and setting the recognized face of the user first as the feature point, and re-extracting another body part or object adjacent to the face and setting the re-extracted another body part or object as the another feature point when the recognized face disappears from the photographing screen.

7. The method for controlling a mobile device cradle of claim 6, wherein the calculating a moving speed and a moving direction of the subject comprises:

resetting the face as a feature point if the face that had disappeared appears again on the photographing screen.

8. The method for controlling a mobile device cradle of claim 1, wherein the setting a subject to be extracted comprises:

that the application automatically recognizes and sets the subject included in the image, or the application manually sets a part selected by the user as the subject.

9. An image combination method performed in an application of a user device linked with a mobile device cradle, the method comprising:

pairing the mobile device cradle with the user device;

starting capturing an image based on an input of a user;

displaying a zone on a photographing screen;

capturing an image for a first area displayed on the photographing screen;

capturing an image for a second area different from the first area, by operating a motor included in the mobile device cradle; and combining a plurality of captured images using the zone, providing a user interface for receiving an input for the number of images to be combined and a rotation direction of the motor; and repetitively performing an operation of capturing an image for another area to which a movement is made based on a particular rotation angle and the rotation direction from an area already captured, according to the number of images to be combined.

10. The image combination method of claim 9, wherein the images captured for the first and second areas each include an area of the zone, and wherein the combining the images comprises:

extracting a common part between the zones for the plurality of images captured; and combining the plurality of images by using the common part extracted.

11. The image combination method of claim 10, wherein the image for the first area comprises a still image of the first area, and the image for the second area comprises a moving image of the second area.

12. The image combination method of claim 11, wherein the combining the images comprises:

creating a new moving image by merging the first area and the second area in which the still image is arranged on one side and the moving image is arranged on the other side around the common part.

13. The image combination method of claim 11, further comprising:

providing a user interface for receiving an input for a rotation direction of the motor and a shooting time of the moving image.

14. The image combination method of claim 9, wherein the rotation angle is determined based on the number of images to be combined and the size of the zone.

15. The image combination method of claim 9, wherein the capturing an image for a first area and the capturing an image for a second area comprise continuously capturing for corresponding areas, and then manually or automatically selecting one image for each corresponding area out of continuously captured images, and the combining a plurality of images comprises combining images selected in each area into one image.

16. The image combination method of claim 9, wherein the zone may be displayed on one side or opposite sides of the photographing screen, and a location and a size thereof are changed according to the input of the user.

17. The image combination method of claim 16, wherein the clear zone comprises:

changing its location on the photographing screen according to a rotation direction of the mobile device cradle based on the input of the user, and being displayed on one side of the photographing screen if the first area is captured, and being displayed on both sides of the photographing screen if the second area is captured.

* * * * *